United States Patent
Jayaram et al.

(10) Patent No.: US 12,154,284 B2
(45) Date of Patent: Nov. 26, 2024

(54) METHODS AND SYSTEMS TO TRACK A MOVING SPORTS OBJECT TRAJECTORY IN 3D USING MULTIPLE CAMERAS

(71) Applicant: MAIDEN AI, INC., Seattle, WA (US)

(72) Inventors: Vivek Jayaram, Seattle, WA (US); Brogan McPartland, Seattle, WA (US); Arjun Verma, Seattle, WA (US)

(73) Assignee: MAIDEN AI, INC., Seattle, WA (US)

( * ) Notice: Subject to any disclaimer, the term of this patent is extended or adjusted under 35 U.S.C. 154(b) by 65 days.

(21) Appl. No.: 17/952,175

(22) Filed: Sep. 23, 2022

(65) Prior Publication Data

US 2023/0100572 A1   Mar. 30, 2023

Related U.S. Application Data

(60) Provisional application No. 63/248,042, filed on Sep. 24, 2021.

(51) Int. Cl.
*G06T 7/292*     (2017.01)
*G06T 19/00*    (2011.01)

(52) U.S. Cl.
CPC .............. *G06T 7/292* (2017.01); *G06T 19/00* (2013.01); *G06T 2207/10016* (2013.01);
(Continued)

(58) Field of Classification Search
CPC ................ G06T 7/292; G06T 19/00; G06T 2207/10016; G06T 2207/20084;
(Continued)

(56) References Cited

U.S. PATENT DOCUMENTS

| | | |
|---|---|---|
| 7,094,164 B2 | 8/2006 | Marty et al. |
| 9,036,864 B2 | 5/2015 | Johnson et al. |

(Continued)

FOREIGN PATENT DOCUMENTS

| | | |
|---|---|---|
| CN | 111866575 A | 10/2020 |
| EP | 3798978 A1 | 3/2021 |

(Continued)

OTHER PUBLICATIONS

International Search Report and Written Opinion mailed Aug. 19, 2022, Patent Application No. PCT/US2022/026579, 12 pages.

(Continued)

*Primary Examiner* — Terrell M Robinson
(74) *Attorney, Agent, or Firm* — Davis Wright Tremaine LLP

(57) ABSTRACT

Systems and methods are described for generating a three-dimensional track of a ball in a gaming environment from multiple cameras. In some examples, at least two input videos, each including frames of a ball moving in a gaming environment recorded by a camera, may be obtained, along with a camera projection matrix that maps a two-dimensional pixel space representation to a three-dimensional representation of the gaming environment. Candidate two-dimensional image locations of the ball across the plurality of frames of the at least two input videos may be identified using neural network or computer vision techniques. An optimization algorithm may be performed that uses a 3D ball physics model, the camera projection matrix and a subset of the candidate two-dimensional image locations of the ball from the at least two input videos to generate a three-dimensional track of the ball in the gaming environment.

20 Claims, 9 Drawing Sheets

(52) U.S. Cl.
CPC ............... *G06T 2207/20084* (2013.01); *G06T 2207/30224* (2013.01); *G06T 2207/30241* (2013.01); *G06T 2219/004* (2013.01)

(58) Field of Classification Search
CPC . G06T 2207/30224; G06T 2207/30241; G06T 2219/004
See application file for complete search history.

(56) References Cited

U.S. PATENT DOCUMENTS

| | | | |
|---|---|---|---|
| 9,094,615 | B2 | 7/2015 | Aman et al. |
| 10,489,656 | B2 | 11/2019 | Lee et al. |
| 11,045,705 | B2 | 6/2021 | Zhang |
| 11,157,742 | B2 | 10/2021 | Zhang et al. |
| 2010/0123830 | A1 | 5/2010 | Vunic |
| 2012/0114184 | A1* | 5/2012 | Barcons-Palau ........ G06T 7/246 382/107 |
| 2013/0039538 | A1 | 2/2013 | Johnson et al. |
| 2014/0004969 | A1* | 1/2014 | Jang ..................... G06T 7/248 473/409 |
| 2015/0260512 | A1 | 9/2015 | Greiner et al. |
| 2015/0373258 | A1 | 12/2015 | Chuang et al. |
| 2017/0256066 | A1 | 9/2017 | Richard et al. |
| 2018/0005383 | A1* | 1/2018 | Suk ............................ G06T 7/35 |
| 2018/0154232 | A1* | 6/2018 | Gentil .............. H04N 21/21805 |
| 2018/0322671 | A1 | 11/2018 | Song |
| 2019/0022487 | A1* | 1/2019 | Joo ........................ A63B 60/46 |
| 2019/0141297 | A1 | 5/2019 | Vaidya et al. |
| 2019/0147219 | A1 | 5/2019 | Thornbrue et al. |
| 2019/0366153 | A1 | 12/2019 | Zhang et al. |
| 2020/0035019 | A1 | 1/2020 | Cappello et al. |
| 2020/0043287 | A1 | 2/2020 | Zhang et al. |
| 2020/0151903 | A1 | 5/2020 | Lee et al. |
| 2020/0226386 | A1 | 7/2020 | Chuang et al. |
| 2020/0246675 | A1* | 8/2020 | Spivak ............... A63B 71/0605 |
| 2020/0298080 | A1* | 9/2020 | Zhang ..................... G06N 3/045 |
| 2020/0368616 | A1 | 11/2020 | Delamont |
| 2021/0192783 | A1 | 6/2021 | Huelsdunk et al. |
| 2021/0220718 | A1 | 7/2021 | Tuxen et al. |
| 2022/0138969 | A1 | 5/2022 | Forsgren et al. |
| 2022/0345660 | A1 | 10/2022 | Jayaram et al. |

FOREIGN PATENT DOCUMENTS

| | | |
|---|---|---|
| WO | 2007035878 A2 | 3/2007 |
| WO | 2020033612 A1 | 2/2020 |
| WO | 2021119462 A1 | 6/2021 |

OTHER PUBLICATIONS

International Search Report and Written Opinion mailed Aug. 5, 2022, Patent Application No. PCT/US2022/026575, 10 pages.

Wu et al., 'Multi-camera 3D ball tracking framework for sports video', IET Image Processing, 2020, vol. 14, No. 15, [retrieved onSep. 20, 2022], Retrieved from: < URL: https://ietresearch.onlinelibrary.wiley.com/doi/10.1049/iet-pr.2020.0757>. Feb. 11, 2021, 11 pages.

Hartley et al., "Multiple View Geometry in Computer Vision," Cambridge University Press, second edition, 2003, 673 pages.

Chen et al., "Ball Tracking and 2D Trajectory Approximateion with Applications to Tactics Analysis From Single-Camera Volleyball Sequences," Multimedia Toold and Applications 60.3, Jun. 21, 2011, 27 pages.

Chen et al., "Physics-Based Ball Tracking and 3D Trajectroy Reconstruction with Applications to Shooting Location Estimation in Basketball Video," Journal of Visual Communication and Image Representation 20.3, 2009, 13 pages.

Chen, "Geometry-Based Camera Calibration Using Five-Point Correspondences From a Single Image," IEEE Transaction on Circuits and Systems for Video Technology, Dec. 2017, 12 pages.

Gomez-Gonzalez, et al., "Reliable Real-Time Ball Tracking for Robot Table Tennis," Robotics, Oct. 22, 2019, 13 pages.

International Search Report and Written Opinion mailed Jan. 17, 2023, Patent Application No. PCT/US2022/076975, 9 pages.

Kamble et al., "Ball Tracking in Sports: a Survey," Artifical Intelligence Review (2019), Oct. 16, 2017, 51 pages.

Parisot et al., "Consensus-Based Trajectory Estimation for Ball Detection in Calibrated Cameras Systems," Journal of Real-Time Image Processing, Sep. 22, 2016, 16 pages.

USPTO Final Office Action dated Aug. 29, 2023, U.S. Appl. No. 17/731,005, 16 pages.

* cited by examiner

METHODS AND SYSTEMS TO TRACK A MOVING SPORTS OBJECT TRAJECTORY IN 3D USING MULTIPLE CAMERAS

CROSS-REFERENCE TO RELATED APPLICATIONS

This application claims the benefit of U.S. Provisional Patent Application No. 63/248,042, filed Sep. 24, 2021, and co-pending U.S. patent application Ser. No. 17/731,005, filed on Apr. 27, 2022, entitled "METHODS AND SYSTEMS TO AUTOMATICALLY RECORD RELEVANT ACTION IN A GAMING ENVIRONMENT," which claims the benefit of U.S. Provisional Patent Application No. 63/180,235, filed Apr. 27, 2021, entitled "METHODS AND SYSTEMS TO AUTOMATICALLY RECORD RELEVANT ACTION IN A GAMING ENVIRONMENT," and co-pending U.S. patent application Ser. No. 17/730,865, filed on Apr. 27, 2022, entitled "METHODS AND SYSTEMS TO TRACK A MOVING SPORTS OBJECT TRAJECTORY IN 3D USING A SINGLE CAMERA," which claims the benefit of U.S. Provisional Patent Application No. 63/180,228, filed Apr. 27, 2021, entitled "METHODS AND SYSTEMS TO TRACK A MOVING SPORTS OBJECT TRAJECTORY IN 3D USING A SINGLE STATIONARY CAMERA," the disclosures of which is incorporated herein by reference in its entirety.

BACKGROUND

Over the last two decades, 3D ball tracking has rapidly grown in popularity at the highest levels of professional sport. Some examples of this include the use of Hawkeye Innovations technology or VirtualEye technology for reviews at international-level cricket tournaments and at tennis grand slams. Today, 3D ball tracking is widely used across sports for decision reviews, viewer engagement, and automatic data collection. While average people who play sport, and even professionals who are not playing in the biggest tournaments, do not expect to play in an environment where such technology is enabled, the ability to track the ball in 3D and receive the analytics derived from it has become a notable element of both fan engagement and performance analysis in sport. Data derived from the ball tracking technologies can be used by players, teams, coaches and analysts for performance improvement, as well as by commentators and broadcasters to display interesting insights, thereby further engaging audiences.

Unfortunately, such technology is only available at the highest level of sports. The reason for inaccessibility of such technologies at a broader scale relates to their exorbitantly high prices, as well as complicated maintenance, installation and operational requirements. Often, these technologies require multiple (e.g., 6-10) high speed cameras which are time-synchronized to each other. They usually operate at high frames per second (e.g., 340 fps), and have optic fiber cables connecting these cameras to a central hub to enable time-synchronization. The plurality of cameras which are synchronized allow for triangulation of the ball position at a specific moment, and the optic fiber cables allow for the cameras to be time synced with very small margin, which makes triangulation more accurate. Such extensive hardware and manual involvement are crucial to keep the tracking within the margin for error that is permitted at the highest level of sport (for instance, the International Tennis Federation requires less than 5 mm accuracy and Hawkeye claims to deliver average accuracy within 2.6 mm). The broad market has much to gain from similar technology, even at lower accuracy, by using the derived data for performance improvement, scouting, social media sharing, etc. However, the financial installation, maintenance and operational obstacles of such technologies make them inaccessible. Easier-to-operate, lower-cost solutions, with lower accuracy, have been created for the broader market (e.g., https://playsight.com/), but these also generally require multiple cameras, additional hardware and a level of investment, maintenance and operation that is often infeasible for club-level players, academies and even professionals at practice. Other solutions track the ball in 3D using the size of the ball to infer the distance from the object to the camera, but such solutions fail for small balls/objects as well as in cases with high amounts of motion and motion blur in the recording.

In view of the foregoing, a need exists for a 3D ball tracking technology that involves minimal hardware, is highly affordable, and is easy to install and maintain to overcome the aforementioned obstacles presented by current solutions.

BRIEF DESCRIPTION OF THE DRAWINGS

Various techniques will be described with reference to the drawings, in which.

DETAILED DESCRIPTION

Figure 1:
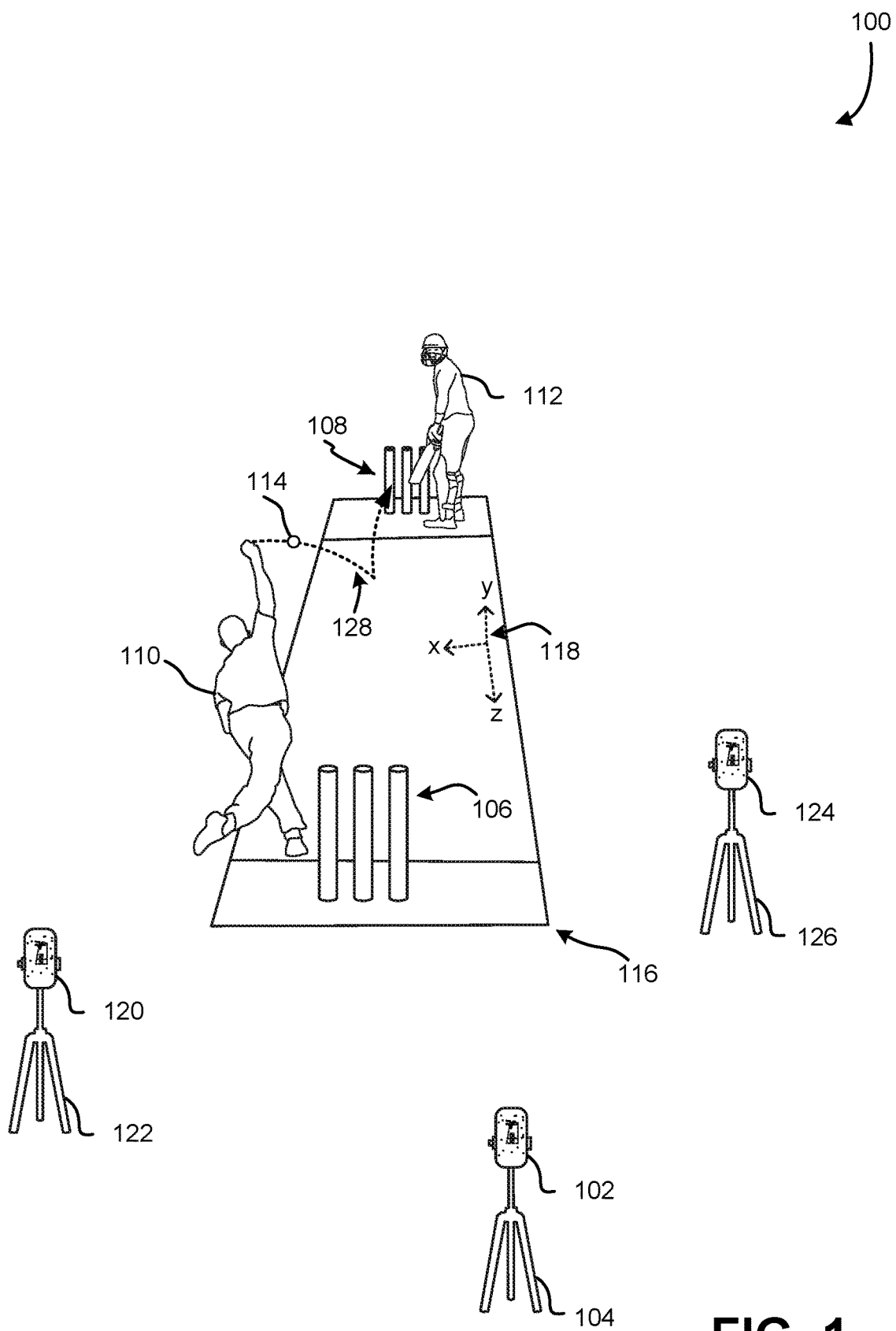
FIG. 1 illustrates an example of a device/system, in a gaming environment, that captures video and generates a 3D track and/or other metrics of a ball in the gaming environment, according to at least one embodiment.

Systems and methods are described herein for generating a track or path of a ball or other sports object moving in three dimensions (3D) using multiple cameras, such as may be used in various gaming environments. In some aspects, 3D ball tracking systems and methods address one or more of the aforementioned problems by computing the 3D track of a ball moving in a gaming environment (e.g., at a cricket game, baseball game, football game, soccer game, basketball game and the like), where video of the gaming environment is received from one or preferably multiple camera equipped devices (e.g., a smart phone, digital camera, or the like), where the cameras do not need to be synchronized in time. In some cases, using various techniques, a 3D track may be fitted to a set of two dimensional (2D) points from video frames and refined to conform to known physics about the characteristics of the ball in specific gaming environments. The process may be iterated over multiple sets of 2D points of videos from multiple cameras, where the resulting 3D track or path is derived to account for potential time offsets of the various videos from the different cameras.

While existing 3D ball tracking systems may utilize multiple high speed cameras operating at high frame rates (e.g., 340 frames per second (FPS)), with fiber optic cables connecting these cameras to synchronize the cameras in time, the described solution can reduce the complexity and cost of these existing systems, while still generating accurate results, by utilized camera equipped devices that are not time synchronized and can operate at much lower frame rates (e.g., 30 or 60 FPS). Existing systems may perform a frame-by-frame triangulation of the sports object across multiple cameras, which typically requires time synchronization of the input videos, so that it can be assumed that, when the ball's position is being triangulated for a set of frames received from the multi camera setup, the frames were collected at the exact same instant in time. However, in some embodiments, it can be desirable to have easier and more affordable solutions to 3D tracking of sports objects.

The described systems and techniques include receiving input video from one to multiple cameras in the sporting or gaming environment that may not be time synchronized. Some embodiments can include novel forms of optimization that can find the 3D track of the object from multiple videos captured by cameras placed at various positions in or around the field of play. Various examples of such a method can work with both standard cameras and/or mobile computing devices or smartphones. In some embodiments, mobile computing devices can offer the benefits of high frame-rate cameras, powerful in-built processing units capable of running complex machine learning models, and various options for network connectivity. Various embodiments can be configured to provide a very accurate 3D sports tracking system that is more affordable and easier to install, maintain and operate than other existing systems.

In various embodiments, video of the gaming environment can be obtained from a number of different cameras (e.g., can be smartphone cameras, digital cameras or the like) which may be placed or located in various locations facing the field of play, or more generally a gaming environment. In some cases, for each camera/video input, a projection matrix mapping the 3D real world coordinates to 2D image coordinates may either be derived or obtained (e.g., determined by another device, and/or obtained from a prior performance of the described techniques, such as for a prior pitch for a stationary camera). In various examples, using a greater number of cameras in this system can result in higher accuracy. In some embodiments, the number of cameras can include or be between 2 and 5, but may be any suitable positive integer in further embodiments, such as 6, 7, 8, 9, 10, 15, 20, 25, 50, 100, or the like.

As used herein, a single camera or filming device may refer to one or more cameras that are co-located, such as one, two, or three, etc., cameras that are all part of the same camera or device but are collocated. The camera may be stable, such as on a tripod or mount, or may be moving, such as a handheld camera or attached to a moving camera operator (e.g., a camera mounted on a helmet of a player in a gaming environment). The described techniques may preferably use multiple input videos from different camera devices. Each input video may include a plurality of frames of a ball moving in a gaming environment, such as captured at, for example, a minimum of 30 FPS, but which may also be captured at higher rate, such as 60 FPS, 90 FPS, 240 FPS, etc., with higher frame rates yielding more accurate results.

In some cases, the described 3D ball track generation techniques may be utilized in connection with automatically recorded action segments in a gaming environment, as described in co-pending U.S. patent application Ser. No. 17/731,005, titled "METHODS AND SYSTEMS TO AUTOMATICALLY RECORD RELEVANT ACTION IN A GAMING ENVIRONMENT," the contents of which are hereby incorporated by reference in their entirety. In yet some cases, when only one camera or input video is available, one or more techniques as described in co-pending U.S. patent application Ser. No. 17/730,865, titled "METHODS AND SYSTEMS TO TRACK A MOVING SPORTS OBJECT TRAJECTORY IN 3D USING A SINGLE CAMERA," the contents of which are hereby incorporated by reference in their entirety, may be utilized in combination with the described techniques.

In order to compute a 3D ball track, various embodiments can perform one or more of following example steps or operations. First a neural network, computer vision algorithm, or a combination thereof may be utilized to identify candidate 2D image locations of the ball across a plurality of frames in each input video. In various embodiments, any suitable number of candidates 2D image locations, including 0, may be identified for each frame of each of the input videos. These candidates can be identified in some examples using a Convolutional Neural Network (CNN) which is trained on a suitable number (e.g., thousands) of images where the 2D image location of the ball is labelled. This CNN may be trained on single images, in some embodiments, where the image location of the ball is labelled or, in the example case of a temporal CNN, on a sequence of frames (e.g., 3 consecutive frames or other suitable number of consecutive frames such as 2, 4, 5, 6, or the like), which can allow the CNN to learn to identify a ball as it's 2D position changes across frames, while its 3D position is changing in the real world. Example CNN architectures may include the UNet or ResNet architectures which can be used for object detection in computer vision. In some embodiments, input video may also be cropped based on the projection matrix in order to only focus on areas of the gaming environment where the ball is likely to be located. In some aspects, such as for the cricket example, a deep neural network may be trained with thousands of example images of moving cricket balls. In one example implemented embodiment for cricket, over 10,000 frames of ball data from 50 different physical locations were collected and annotated. In some examples, this model may be run on every frame of each of the videos for a three second period after the bowler releases the ball. The ball is detected in 2D, meaning that the position in the image in pixels is inferred, not the position in meters in the 3D world.

In some cases, a camera projection matrix may be used to map between 2D image coordinates and 3D real world coordinates. In some cases, the camera projection matrix may be either be derived or obtained. In some cases, the camera projection matrix may be derived or generated by identifying a number of points (e.g., 2, 4, 6, 8, etc.) in the gaming environment that have a fixed dimensional relationship with each other or a known position relative to other objects in the gaming environment (e.g., a player). These points may be correlated between a 2D pixel space representation and a 3D physical representation. In the example of cricket, the points may include identifying locations of the batter and bowler stumps (e.g., the tops and bottoms of each of the stumps), as these are at a known distance from one another. Using these real-world distances, a correlation or mapping between 2D pixel space of a given frame of the video can be mapped to real world coordinates in 3D. In some embodiments where the camera is stable, the camera projection may be the same for the entire video, e.g., such that a single camera projection matrix may be determined and used for multiple frames comprising a video. In other embodiments, a different camera projection matrix may be derived for each frame or a subset of frames, using several different methods described in later sections. Multiple camera projection matrices may be used in cases where the camera is moving or not perfectly stationary, such as in a handheld smartphone or other camera device, a camera mounted on another object (e.g., a helmet camera, a camera mounted on another piece of sports equipment or object in a gaming environment, and so on). In some cases, when a camera is mostly stationary, but may move slightly during video recording, one camera a projection matrix may be used to conserve computing resources at the expense of accuracy. In other examples, multiple matrices, such as for each frame, or every other frame, every third frame, etc., may be utilized to optimize a desired balance between accuracy and resources used by the camera device/computing device (battery, storage, processing power, etc.).

Second, an inlier detection algorithm and/or an optimization algorithm may be performed, such as in multiple iterations, to find the best fitting 3D curve using the 2D image location candidates of the ball from the cameras and a physics model that defines the movement of the ball in the given sport. In various cases, the position of the ball in a 2D image may not uniquely identify the position in 3D. This may be because the ball can be at various distances from the camera and still appear in the same 2D image location. However, when a ball is moving, in various examples, the trajectory can be modeled with simple laws of physics. A system can then find the best 3D curve that satisfies the laws of physics and also matches up with the observed ball locations in 2D. The 3D model of the ball's movement in the real-world can be defined in some examples via parametric coordinates with an equation for each dimension, such as including three equations, each describing movement of the ball in a given x, y, z coordinate system. It should be appreciated that other coordinate systems and various equations may be used, such as based on the type of object being tracked, the known or assumed movement patterns of the object, etc., various know or derived limitations on certain speeds, accelerations, or directions of the object, and so on. In some examples, a ball physics model can be more complex to account for bounce, spin, swing (e.g., in air curve), and air resistance (e.g., slowdown). For example, in various embodiments, the y function may be a piecewise quadratic in a sport like cricket where the ball frequently bounces during the pitch. The x function in some examples may also be a quadratic function to account for a sport like baseball where the ball's movement in the horizontal direction may not be linear due to possible curve balls.

In cases where one or more of the input videos are not time synchronized, such that the input videos start at different times relative to the ball or sports object being hit, thrown, etc., the time offset between the input videos may be taken into account. In some cases, a primary camera or input video may be selected, and the equations that define movement of the sports object in three dimensions for the other input videos may be solved relative to the time of the primary input video.

To determine the 3D track that best aligns with the 2D image location candidates from the various cameras and the physics model of the ball's movement, various systems can perform one or more of the following steps or operations, which can be based on the RANSAC method of optimization. First, a number of subsets of two-dimensional image locations for the sports object may be selected from one or more (e.g., each) of the input videos. In some cases, each frame from the input videos may only be selected if it contains one sports object or ball location per frame. In some embodiments, the subsets may all contain the same number of elements, such as 6 or other number of image locations for each camera, but in further embodiments, they may contain a differing number of elements.

Next, an optimization algorithm may be performed on the subsets of image locations to find a 3D curve that best aligns with the number of subsets of image locations. In some cases, this may include utilizing a nonlinear least-squares optimization. In some examples, a Ceres Solver library and the Levenberg-Marquardt algorithm may be used to compute the nonlinear least-squares optimization. In some embodiments, this optimization may be highly non-convex and difficult to solve. Some methods of solving this optimization problem benefit from having accurate initial estimates of the solution. Good estimates of the solution in some examples, can be provided by using additional computer vision methods. In some embodiments, pose-estimation can be used to estimate when the ball or sports object was thrown, and initialize the parameters with values corresponding to this release time.

Next, the optimization algorithm can be run multiple times over some or all of the two-dimensional image location candidates, across the various input videos, to find the number of inlier two-dimensional image locations that lie within a selected threshold distance, (e.g., in 2D space) of the 2D projection of the 3D ball track. In some embodiments, the inliers may be found by finding detections from the entire set of candidate image locations, where the score of an iteration may be defined as the number of detections that satisfy the threshold distance metric. In some cases, one or more of the above steps may be repeated for a number of iterations. In some cases, the number of iterations, which may be selected and refined, in some examples, based on various factors like the computing device's processing power, or the like. In some aspects, a 3D curve may then be fit to the candidate image locations, such as using the optimization algorithm described above, also using the inlier detections, such as from the iteration that had the highest score. In this way, by using a number of different subsets of image locations and iterating through various optimizing and inlier detection processes, the time offset between the various input videos can be solved for to yield an accurate 3D curve or set of equations that define the sports object's movement in 3D, without needing higher frame rate cameras and without requiring the cameras to be time synchronized.

In some cases, the inlier detection algorithm, may include RANSAC in conjunction with the optimization algorithm. In yet some cases, selecting the subset of the candidate two-dimensional image locations of the ball from the candidate two-dimensional image locations of the ball may include removing erroneous candidate locations of the ball, from one, some, or all of the different input videos. A three-dimensional track of the ball may be generated using the determined parameters in the equation that estimates the three-dimensional position of the ball moving in the gaming environment. In some aspects, the three-dimensional track of the ball and metrics of movement of the ball on the three-dimensional track may be provided to the user device, such as via a graphical representation of the track of the ball in the gaming environment with metrics overlaid onto or displayed proximate to the graphical representation of the track.

In some embodiments, the described techniques may be performed in real-time on smartphones or other computing devices that may be used for recording, such as an iPhone, iPad, or Android phone, or may be performed in the cloud or by remote computing devices by uploading the videos and processing the video on a remote server, for example. In additional embodiments, various data can be communicated between filming or camera devices using any of a variety of different networking technologies, such as Bluetooth, infrastructure Wi-Fi, or web socket connections, cellular networks, and so on. The videos may be processed on each filming device with the candidate ball detections communicated between devices, to a primary filming device that has computing capabilities, or the videos themselves may be sent to a central processing unit which can perform algorithms for 3D ball tracking.

In some cases, generating the 3D ball track may also include applying one or more constraints to the equation, such as based on the three-dimensional physics model of the ball, where the constraints are selected based on a specific type of gaming environment. The constraints may include one or more of the following: a location in a frame of the plurality of frames of where the ball is pitched from; a sound captured by the video input that correlates to a specific action or event in the gaming environment; deviation in the horizontal or vertical direction of the ball being less than a threshold for a specific gaming environment; a speed of the ball being between a minimum speed and a maximum speed; or a position of one or more of the players in the gaming environment. These constraints may apply know or observed limitations or boundaries to characteristics of the ball and relationships between the ball and objects in the gaming environment to better refine the generated 3D ball track.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) a more robust system for tracking an object in 3D that does not require high frame rate cameras devices that are time synchronized (2) faster and more efficient calculation of a 3D track of an object requiring less processing resourcing; (3) real time or near real time generation of a 3D track of an object for real time analytics and performance improvement; and (3) other advantages as will be made apparent in the rest of this disclosure. As will be appreciated by the remainder of this disclosure, the described systems and techniques provide for a widely adaptable and intuitive system for use in various gaming environments.

FIG. 1 illustrates an example diagram 100 of a system including multiple camera enabled devices 102, 120, 124, in a gaming environment, that can be used to capture videos and generate a 3D track and/or other metrics of a ball in the gaming environment. Example diagram 100 depicts part of a cricket field 116, including bowler and batter stumps 106, 108, a player in the bowling positing 110, a batter 112 and a ball 114 as it is being pitched by the bowler 110. The 3D trajectory of the ball 114 is shown as a dotted black line 128.

As described in greater detail herein, multiple camera devices 102, 120, 124 may be positioned proximate to the field of play 116 to capture video of pitches made by the bowler 110 (or alternatively hits by the batter 112). Video from one or more of cameras devices 102, 120, 124 may be analyzed to generate a three-dimensional (3D) track of the ball as it is pitched, from the 2D frames captured by the camera devices 102, 120, 124. This generated 3D track may be provided to the bowler 110, coaches, trainers, and even audiences to provide for better training of the bowler 110, analysis of game play, and even to enhance the audience's experience while watching a game by displaying various metrics of the movement of the ball, such as may be derived from the generated 3D track, such as through one or more of devices 102, 120, 124.

In some cases, one or more of camera devices 102, 120, 124 may also have computing capabilities such that they can perform at least some of the processing needed to generate a 3D representation of movement of the ball. In various examples, processing of one or more video inputs may be performed by a camera device equipped with computing capabilities, a remote computing device or cloud provider, or combinations thereof. Various different configurations of implementations of a 3D sports object tracking system will be described below in reference to FIGS. 2, 3, and 4.

In some aspects, a stable camera, or a camera stable for at least a few seconds, may be advantageous in providing more accurate camera alignment/generating a camera projection matrix, to better map the 2D image data to 3D physical coordinates. As illustrated, in some examples, this may be accomplished by a tripod or other camera or smartphone stabilization device 104, 122, 126. The cameras devices 102, 120, 124 may be positioned anywhere proximate to or even in view of the movement of the ball that is desired to be captured, and preferably with an unobstructed view of the ball through the range of movement desired to be captured. One advantage of the described systems and techniques is that perfect camera alignment or a specific position is not needed, as each of camera devices 102, 120, 124 can be calibrated at any location, whether they are stable or unstable. As depicted in FIG. 1, three cameras 102, 120, 124 are positioned around and behind the bowler 110 spanning approximately 150 degrees. It should be appreciated, and as will be described in other examples below, cameras 104, 120, 124 may be positioned anywhere near the object, e.g., the ball 114 in the illustrated example, that is desired to be tracked. The described techniques, although they may decrease in accuracy, may use video input from cameras very far away, obstructed by various objects in between the camera device and the sports object or ball.

An example coordinate system, such as a Cartesian coordinate system, is also shown in the image via direction con 118. The arrows point in the positive direction for each axis. All real-world units are described herein in meters, however other measurement systems (e.g., standard), can be used to similar effect. In one example, the origin may be the center of the pitch on the ground. This point for the origin may be selected to provide symmetry for the gaming environment. The X axis may be aligned sideways or perpendicular to the direction of the throw of the ball (leg side vs offside). The Y axis may represent the vertical direction, where positive is above the ground. The Z axis may represent the direction of the throw of the ball, where positive is towards the direction of the bowler 110 or batter 112. It should be appreciated that other coordinate systems, including polar coordinate systems, cylindrical or spherical coordinate systems or other systems may be used to a similar effect and/or may be selected to better represent movement of an object in various different gaming environments.

As used herein, a video or video input may include a finite set of frames (images) displayed quickly in sequence to create the illusion of continuity (or smoothness). The level of smoothness depends, largely, on the frame rate of the camera device being used. Frame rate is measured in frames per second (FPS). The default setting on typical smartphones is usually 30 fps or 60 fps, but modern phones are also capable of higher frame rates which are used in features such as slow-motion video (usually 240 FPS). In some aspects, the described models are built to run with feasible accuracy at 30 FPS (which saves phone storage and battery), but they can also run at higher frame rates, which would increase the accuracy further. Furthermore, images themselves are just a grid of pixels e.g., 1280×720, each having an RGB (Red, Green, Blue) value, for example. Therefore, a video can be represented as a list of frames, which is a 2D array of pixel values. For example, a 5 second video at 720p and 30 fps will be a (1280×720×3×150) sized array of numbers.

As will be described in greater detail below, using the described techniques, movement of the ball may be captured using one or multiple cameras and a 3D track of the ball generated therefrom. The 3D ball track may be provided to various users to aid in improving skills, judging competitions, and the like. In some cases, various metrics, such as speed, bounce, height, etc., can also be determined based on the 3D ball track and provided to a user to better inform the user on other attributes of the ball in motion. It should be appreciated that a cricket gaming environment is only given by way of example, and that the described systems and techniques can be adapted and applied to various other gaming environments including baseball, football, soccer, basketball, and various other gaming environments that utilize a ball or other moving object where analysis of the movement of such a ball or object would be useful.

Figure 2:
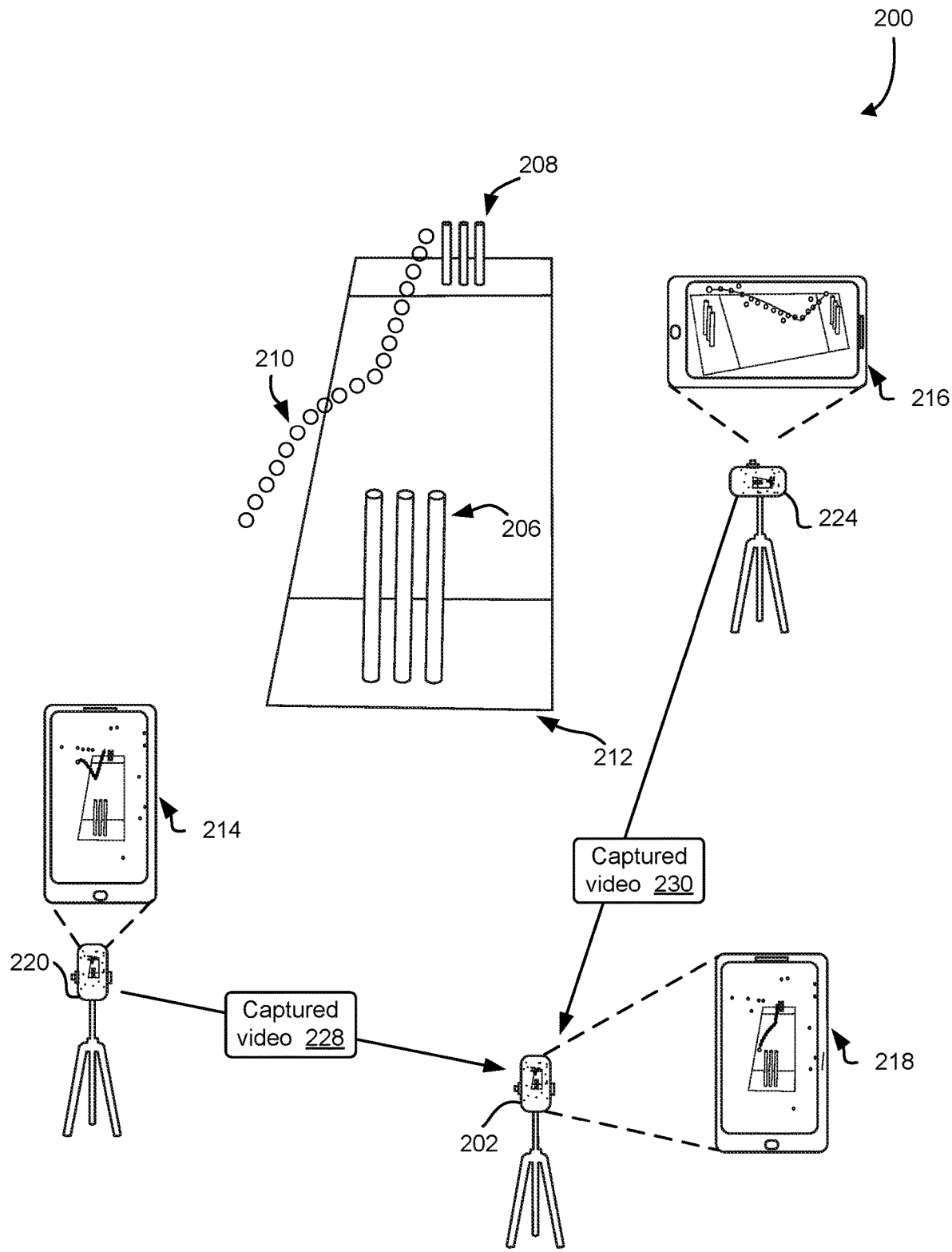
FIGS. 2, 3, and 4 illustrate examples of a system including multiple cameras, in a gaming environment, used to capture video and generate a 3D track and/or other metrics of a ball in the gaming environment, according to at least one embodiment.

FIG. 2 illustrates another an example diagram 200 of a system including multiple camera enabled devices 202, 220, 224, in a gaming environment, that can be used to capture videos and generate a 3D track and/or other metrics of a ball in the gaming environment. Example diagram 200 depicts a cricket field 212, including bowler and batter stumps 206, 208, and a ball trajectory 210 represented by multiple positions of a ball as it is pitched from bowler stumps 206 to batter stumps 208. Multiple camera devices 202, 220, 224 may be positioned proximate to the field of play 212 to capture video of movement of the ball/trajectory of the ball 210. Video from one or more of cameras devices 202, 220, 224 may be analyzed to generate a three-dimensional (3D) track of the ball as it is pitched, from the 2D frames captured by the camera devices 202, 220, 224.

In some cases, one or more or camera devices 202, 220, 224 may also have computing capabilities such that they can perform at least some of the processing needed to generate a 3D representation of movement of the ball. In the illustrated example of FIG. 2, camera device 202 may be selected as the primary camera device. In some cases, the primary computing or camera device 202 may be self-selected or designated, such as by starting to record video of the gaming environment first, by requesting other video inputs from other devices, by being the only device operable with computing resources to perform any of various stages of the processing, or via a number of different mechanisms. In some cases, camera/computing device 202 may be executing an application that enables the described techniques to be performed, and may through the app, receive a selection of starting to record video 218 and/or starting the process of generating a 3D track of the ball 210. In this scenario, the primary camera device 202 may communicate with other devices 220, 224, to begin recording video, represented by video 214, 216, respectively, as well, and send the captured or input video, such as represented by 228 and 230, back to primacy camera device 202 upon completion of recording of the video/upon satisfaction of other conditions that may indicate that movement of the ball is no longer taking place or no longer relevant (e.g., the ball is hit by batter and no further analysis of the ball after the pitch is complete is indicated via the application).

Upon receiving the captured video 228, 230, the primacy camera device 202 may use the captured video 228, 230 along with its own captured video 218, to generate a 3D track of the ball moving through the cricket field 212. In some cases, the primary camera device 202, when equipped with sufficient computing capabilities, may perform some or all of the processing to generate the 3D ball track, as will be described in greater detail below. In yet other cases, the primary computing device 202 may send the captured video 228, 230, 218 to a 3D tracking system, such a 3D ball tracking system 506, as will be descried below in reference to FIG. 5, to determine the 3D track of the ball, which may send the resulting 3D track back to at least the primary camera device 202, and/or the other camera/computing devices 220, 224, in the case that these devices are equipped with a viewing screen (e.g., are smartphones).

Figure 3:
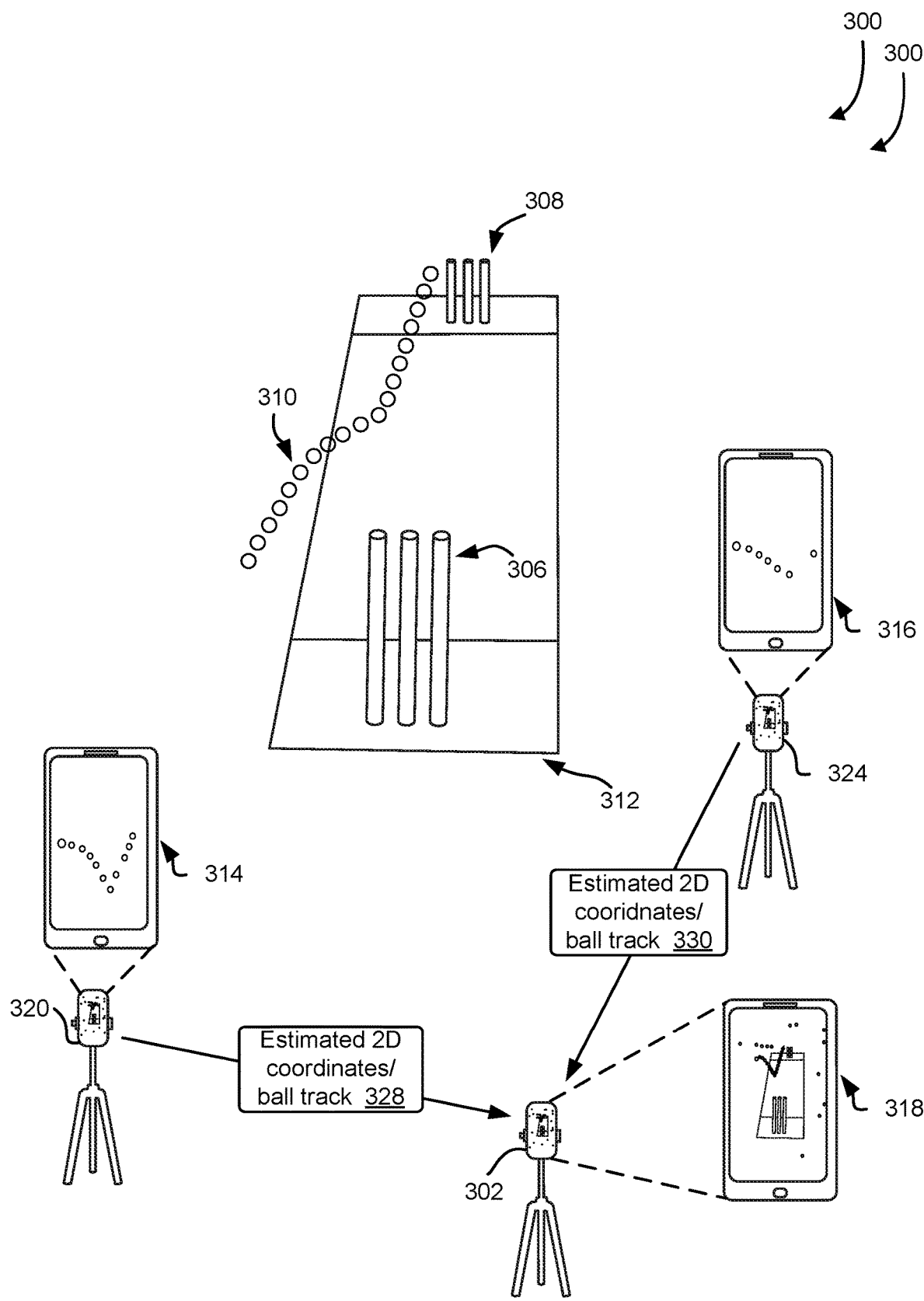

FIG. 3 illustrates yet another an example diagram 300 of a system including multiple camera enabled devices 302, 320, 324, in a gaming environment, that can be used to capture videos and generate a 3D track and/or other metrics of a ball in the gaming environment. Example diagram 300 depicts a cricket field 312, including bowler and batter stumps 306, 308, and a ball trajectory 310 represented by multiple positions of a ball as it is pitched from bowler stumps 306 to batter stumps 308. Multiple camera devices 302, 320, 324 may be positioned proximate to the field of play 312 to capture video of movement of the ball/trajectory of the ball 310.

In the example illustrated in FIG. 3, each of devices 320, 324, 320 may capture video 314, 316, 318 of movement of the ball. Each of these devices 320, 322 may have sufficient computing resources (e.g., processing capability, memory, an application to direct processing, etc.) to extract or estimate 2D image positions of the ball and/or a track of the ball 328, 330 in various frames of the captures video 314, 316. Devices 320, 324 may communicate the 2D image locations (e.g., which may comprise pixel information/coordinates identifying where the ball is located in each frame) to a primary camera device 302 or a remote server/system (not shown). In this scenario, the devices 320, 324 may only send the 2D image locations of the ball back to primary device 302, to perform additional processing. In this scenario, by doing at least some of the processing (e.g., obtaining or determining a camera projection matrix and/or performing one or more optimizations or inlier detection processes to select a set of candidate ball locations), the amount of data communicated over one or more network connections may be decreased. This may reduce network data usage of the camera device (e.g., in the case they are smartphones connected to a cellular network), in communicating potentially large amounts of data via video segments. In other cases, by doing some of the processing on the individual camera devices 320, 324, and/or 302, efficiency gains both in terms of parallel processing of the different input videos, and in reduced time needed to communicate less data to another device or remote service may be achieved. In some cases, a hybrid model may be employed where some processing is done on some camera devices and reduced or no processing is done on other camera devices.

Video 314, 316, 318 from one or more of cameras devices 320, 324, 302 may be analyzed to generate a three-dimensional (3D) track of the ball as it is pitched, from the 2D frames captured by the camera devices 320, 324, 302. The calculated 3D ball track may then be communicated either from the remote system or via the primary camera device 302, to devise 320, 324. This implementation may be particularly beneficial when limited network connectivity is available, when the video inputs comprise a large amount of data, and/or the camera devices have sufficient processing capabilities. In this respect, sending only 2D coordinates of ball locations from various frames of the input video may contain far less data than various resolutions of the video input.

Figure 4:
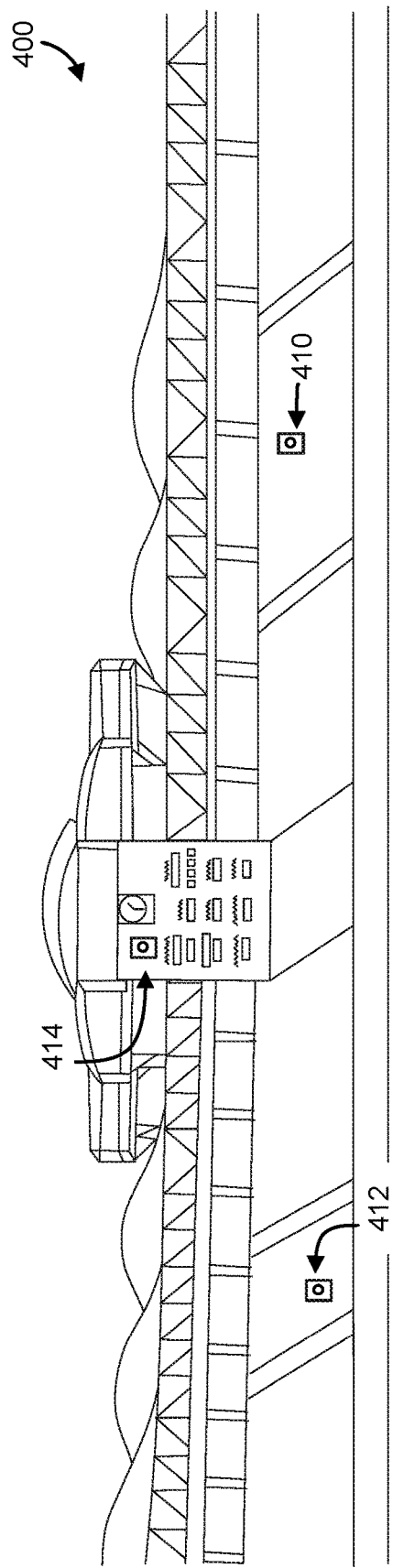
Figure 4:
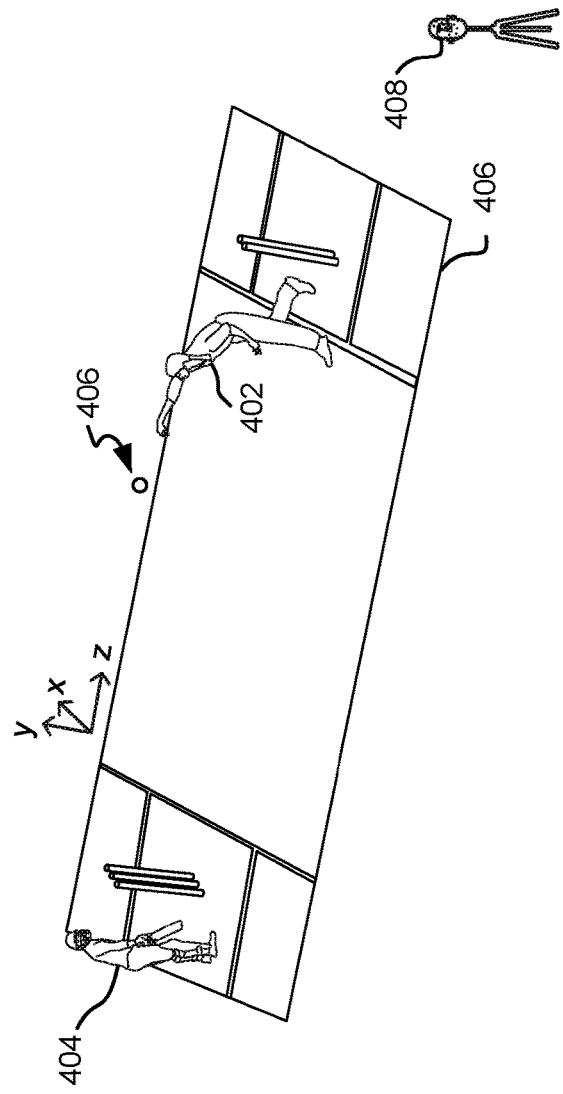

FIG. 4 illustrates yet another an example diagram 400 of a system including multiple camera enabled devices 408, 410, 412, 414 in a gaming environment, that can be used to capture videos and generate a 3D track and/or other metrics of a ball or other sports object in the gaming environment. Example diagram 400 depicts a cricket field 406, including bowler 402 and batter 404, and a ball 406 being thrown by the bowler 402. Multiple camera devices 408, 410, 412, 414 may be positioned proximate to the field of play 406 and/or in or around a stadium to capture video of movement of the ball 402. In this example, each camera device 408, 410, 412, 414 may capture video and send the video to a 3D tracking system, such as 3D ball tracking system 504 described below in reference to FIG. 5, which may, in some cases, be remote to the stadium.

In the example illustrated, video input from various devices around a stadium, such as in amateur or professional sports, may be collected and used, according to the described techniques to generate and increase accuracy of a 3D track of the sports object in motion. The various camera/computing devices may include one or more camera devices associated with the stadium, such as 414 (e.g., a dedicated or stationary camera or multiple camera devise used to capture sporting events), one or more fan or spectator camera devices, such as 410, 412, and/or one or more player camera devices (e.g., a helmet camera or other similar device (not shown)), or stationary camera devices, such as camera device 408, around the field of play. In this example, an application may be provided to fans or other users, to install on their mobile devices. The app may prompt users to record video of game play, may collect that video, and/or send it to one or more servers or other computing devices, to be used in generating a 3D track of the sports object. In this way, any video input of the sports object in motion may be used to help improve accuracy of the resulting 3D track and or associated metrics.

It should be appreciated that in any of the examples described in reference to FIGS. 2, 3, and 4, that various modifications to the system may be made. Such as, having a central or primary computing device that is not associated with a camera and/or does not acquire video of the gaming environment to receive input video from various camera/computing devices, and either perform processing to generate the 3D track, perform some processing, and/or rely fully on a remote system to generate the 3D track.

Figure 5:
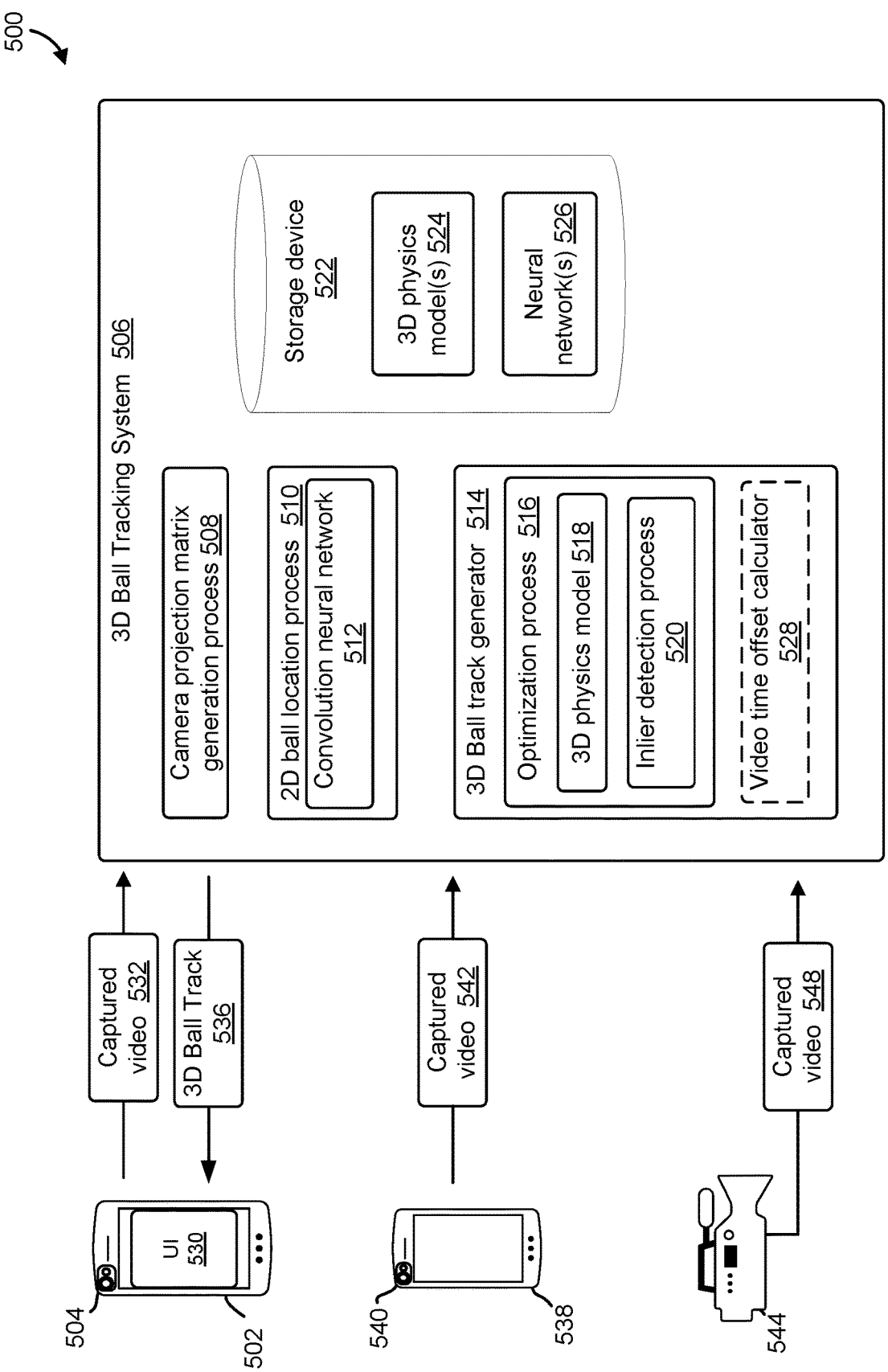
FIG. 5 illustrates an example 3D ball tracking system, according to at least one embodiment.

FIG. 5 illustrates diagram 500 of an example 3D ball tracking system 506 in communication with various camera enabled devices 502, 538, 544. As illustrated, a user device 502, such as a smartphone or other computing device (e.g., laptop, tablet, or even a desktop computing device), may include or be connected to or in communication with a camera device 504. Camera device 504 may include one or more video or image capturing devices. The user device 502 may also include a graphical user interface 530, which may display images or video captured by the camera device 504, such as when taking a video or image, and may display a generated 3D ball track from a gaming environment, including, in some cases, metrics associated with movement of the ball captured or derived from the generated 3D ball tack. As also illustrated in FIG. 5, various other camera devices, such as a mobile computing device 538 equipped with a camera device 540 may also capture and send capture video 542 to the 3D ball tracking system 506. In addition, one or more dedicated camera device 544 may also capture and communicate input video 548 to the 3D ball tracking system 506. It should be appreciated that any number of a variety of different camera devices/computing devices may communicate video (or is some embodiments, processed video, 2D image location data, and/or an already generated 3D track), to the 3D ball tracking system 506. In some cases, the video may be communicated to the 3D ball tracking system 506 in real time or near real time (e.g., immediately following completion of a pitch or other play in the gaming environment) or may be communicated sometime after completion of the play, to be analyzed at a later time.

In some cases, the user device 502, such as through the camera device 504, and/or device 538 and 544, may capture video of an action in a gaming environment, such as a pitch or throw of a ball, and may communicate that video at operation 532, 542, 548 to a 3D ball tracking system 506. As illustrated, the 3D ball tracking system 506 may be a collection of computing resources that can process video input and output a 3D track or movement path of a ball in an environment, such as a gaming environment, as well as metrics or other information associated with movement of the ball (or another object). In some cases, one or more components of the 3D ball tracking system 506 may include hardware resources, software resources, and/or could computing resources, or any combination thereof. In some cases, the 3D ball tracking system 506 may be provided by one or more servers that are in communication with the devices 502, 538, 544. In other cases, the 3D ball tracking system 506 or components thereof may be provided by one or more cloud or virtual computing resources, such as virtual machines, containers, etc., virtual databases, etc. In yet some cases, some or all of the 3D ball tracking system 506 may be provided by one or more of device 502, 538, 544, whereby zero to some of the processes performed by the 3D ball tracking system 506 may be done in conjunction with various external resources over one or more networks.

As illustrated, the 3D ball tracking system 506 may include a camera projection matrix generation process 508, which may also be generally referred to as camera calibration. In some cases, the camera projection matrix generation process 508 may be a process executed by the 3D ball tracking system 506 to align or map elements in a 2D captured frame or frames to a 3D real world representation of those elements.

Camera calibration is the process of localizing real world points based on the 2D content in an image. The goal is to solve for the camera parameters (location in 3D, rotation, zoom) by identifying points like the stump and pitch where their real-world location is known relative to each other or other important objects or point in a given game. In some aspects, various techniques for performing camera calibration, as are known in image processing and computer vision arts, can be used on video data/frames of a gaming environment to map 2D points captured by a video camera to an accurate 3D representant of the events captured.

In some aspects, camera calibration and processes therefor, may be equivalent to finding a projection matrix which converts a 3D point in meters to a 2D point in pixels, using techniques that are known in the art. For example, assume a 3D point (0, 0, 0), which may represent the middle of the pitch on the ground:

$x \in R^3$

With the projection matrix, the 3D point can be projected to a 2D image point y, i.e., (0,0), which may refer to the top left of the image, where (720, 1280) may refer to the bottom right of the image, which is provided by the following equations:

$y = C*x = \text{Projection}(x)$ $C = x^\wedge(-1)*y$

While this is an oversimplified explanation of determining a projection matrix, (e.g., in some aspects, the process includes more than matrix multiplication), there are a few more steps, but consider this as the projection function, which will be explained in more detail below.

The top and bottom of the stumps may be used as "keypoints". This is because there are well-defined locations for these points in meters (e.g., bottom of striker middle stump is (0, 0, −10.06) in a 3D coordinate system).

In some aspects, to detect the stumps, a U-Net convolutional neural network or other convolutional neural network may be trained to predict the top and bottom of the stumps. The U-Net convolutional neural network may supplement a usual contracting network by successive layers, where pooling operations may be replaced by up-sampling operators. Hence these layers increase the resolution of the output. A successive convolutional layer can then learn to assemble a precise output based on this information. One modification in U-Net is that there are a large number of feature channels in the up-sampling part, which allow the network to propagate context information to higher resolution layers. As a consequence, the expansive path is more or less symmetric to the contracting part and yields a u-shaped architecture. The network only uses the valid part of each convolution without any fully connected layers. https://en.wikipedia.org/wiki/U-Net To predict the pixels in the border region of the image, the missing context is extrapolated by mirroring the input image. This tiling strategy is important to apply the network to large images, since otherwise the resolution would be limited by the GPU memory.

In some cases, the exact number of data points needed to train a Computer Vision model like this varies, but 10000 data points across a diversity of settings (backgrounds, colors, lightings, etc.) may be used to yield acceptable accuracy, in some examples. In one example, where 4000+ data points have been used for training, the resultant model works out-of-the-box in settings that are not similar to ones it has been trained on. As more data is collected and annotated, the model or models may become exceedingly more robust.

In an embodiment, a system/process 508 can calibrate a camera to compute a camera projection matrix which can provide a mapping from points in the actual real-world 3D environment of the camera to 2D points on the screen of the camera/phone. By automatically identifying objects in the gaming environment which are of known sizes and distances from each other, various examples are able to compute this projection matrix. Such objects or markings may include court lines or gaming objects such as hoops, goals, bases, or wickets. The act of computing a camera projection matrix can be done in various suitable ways. For instance, in some embodiments, automatic identification of objects of previously known dimensions is not necessary. In various embodiments, a user may tap on various places on a 2D screen to manually input where certain objects are and then this input can be used to compute a projection matrix. In other embodiments, device sensors such as accelerometers may help in computing the projection matrix by providing additional information about the camera orientation. However, in some embodiments, automatic detection of one or more objects does not require manual input and the system automatically identifies where these objects are on a screen or in an image, after which the camera projection matrix can be computed. Automatic calibration can be used in some examples. Fully manual, fully automatic and hybrid calibration methods can be used in some examples.

In embodiments where the camera is handheld or not completely stable, a camera projection matrix per frame may be computed for high accuracy tracking. In one possible embodiment, this can be obtained by running the aforementioned method on each frame of the video separately to obtain a projection matrix per frame. Alternatively, this may be done on intermittent frames, called keyframes, and the camera calibrations for non-keyframes can be obtained by using optical flow from the keyframes or another similar algorithm which may use the apparent motion of the camera.

In some examples, a projection matrix for a view in a gaming environment, may be determined using bounding boxes or areas that are known to typically contain certain features of the gaming environment, to focus a search or analysis of the pixels within these areas to identify the objects or points that are known to have certain relationships to other objects or location on the field for example. In some cases, this may include using bounding boxes to identify stumps in a cricket game (or alternatively for other points in different types of gaming environments). In some aspects, these bounding boxes may be auto generated and/or input or modified by a user, such as via GUI 530 of a user device 502 used to capture video of game action. In some aspects, the bounding boxes may be drawn, moved, or modified in one or more dimensions by a user using a touch screen GUI. In other aspects, the bounding boxes may be auto generated by the 3D ball tracking system 506, and invisible or hidden to a user.

Continuing the cricket example, the tops and bases of the bowler and batter stumps may be identified. Via identification of the 2D locations (e.g., pixel space locations) of the tops and bottoms of the bowler and batter stumps, the location of the stumps in the 2D image (pixel locations) and in 3D (known real world position in meters) can now be correlated. With this correlation, linear algebra may be used to find the projection matrix. For example, the system has now determined a set of 2D→3D correspondences. For example, the top of the middle stump which has 3D point (0, 0.7, −10) corresponds to image point (250, 400). For each correspondence, 3D and 2D point, $x_i \in R^3$ $y_i \in R^3$ are now known.

The system can solve for a camera matrix which minimizes the reprojection error from the 3D real world point to the detected point in 2D, represented by the following:

$C = \text{Argmin}_C \Sigma_i (\text{Projection}(x_i) - y_i)^2$

This equation may be solved using, for example, the Ceres library, and/or the Levenberg-Marquardt algorithm, as are known by those having ordinary skill in the art. In some cases, a RANSAC technique, or other equivalent technique, may be used to remove outliers (incorrect stump detections). With this projection, a virtual world may be constructed that completely aligns with the user's screen, this generated virtual world also enables tracking the ball in 3D, as opposed to only doing tracking in 2D.

As described above, the projection matrix or model, such as generated by system/process 508, may enable identification of the 2D pixel coordinates of the stumps on the phone screen, where the position of the stumps on screen can be used to establish an understanding or mapping of the 3D world.

In some cases, a user of the described systems and techniques may perform a few simple steps to ensure a device with a camera is setup properly to capture frames/video of a ball in a gaming environment to enable the functionality described herein. First, the user may setup the camera on tripod, or any structure that enables the device to be stationary for at least 5 seconds or so. Next, the device/tripod may be moved or placed at a position such that all stumps are visible (e.g., for some length of time such as 1, 2, 3, 4, 5, 10, 15 seconds, etc.) and there is an unobstructed view of the delivery when the ball is bowled. Some examples of acceptable setups may include anywhere behind the bowler stump, either on the ground or any height above the ground, back and above the bowler stump, and various other positions that still ensure an unobstructed view of the ball as it is thrown or moves in the gaming environment. It should be understood that various techniques to determine a camera projection may be utilized, including the techniques described above and other techniques that rely more heavily on neural networks, for example and computer vision techniques.

As illustrated in FIG. 5, the 3D ball tracking system 506 may also include a 2D ball location process or system 510. In some cases, the 2D ball location process or system 510 may be a process executed by the 3D ball tracking system 506 to identify ball locations throughout a plurality of frames of a captured video including movement of a ball or other gaming object in a gaming environment.

In various examples, any suitable number of candidate 2D image locations, including 0, may be identified for each frame of an input video. These candidates can be identified in some examples using a Convolutional Neural Network (CNN) 512 which may, for example, be trained on thousands of images where the 2D image location of the ball is labelled. This CNN may be trained on single images where the image location of the ball is labelled or, in the case of a temporal CNN in some examples, on a sequence of frames (e.g., three consecutive frames or other suitable number), which allows the CNN to learn to identify a ball as it's 2D position changes across frames, while its 3D position is changing in the real world. Example CNN architectures may include the UNet or ResNet architectures. In other embodiments, an LSTM neural network may be used to detect the ball in a single frame of the video. In various embodiments, the input video may also be cropped based on the projection matrix in order to only focus on areas of the gaming environment where the ball is likely to be located, such as near the pitcher's mound or the cricket pitch. In one implementation of an embodiment for cricket, over 10,000 frames of ball data from 50 different physical locations may be collected and annotated to train the CNN.

In various embodiments, video of the gaming environment can be from C camera devices 502, 538, 544 (e.g., can be smartphone cameras, digital cameras or the like) which are placed in various locations facing the field of play and for each of which the projection matrix mapping the 3D real world coordinates to 2D image coordinates may either be derived or is already known. We can denote this projection matrix or projection function for camera C as $Proj_c$. In various examples, using a greater number of cameras in this system can result in higher accuracy. In some embodiments, C can include or be between 2 and 5, but may be any suitable positive integer in further embodiments, such as 6, 7, 8, 9, 10, 15, 20, 25, 50, 100, or the like.

As also illustrated in FIG. 5, the 3D ball tracking system 306 may also include a 3D ball track or path generator system or process 514. In some cases, a 3D ball track or path generator 514 may be a system or collection of computing resources that executes one or more of an optimization process 516, as will be described in greater detail below, and uses one or more 3D physics models 518 (which be selected according to a type of gaming environment for which the system is operating in or on) to generate a 3D track or path of a ball in video captured of a gaming environment. In some cases, the 3D ball track or path generator 514 may perform an optimization process or algorithm 516 that uses a 3D ball physics model, such as 3D physics model 524, and the 2D image locations of the ball from various input videos from process 510 to find the best fitting 3D curve of a path capturing movement of the ball in time. In yet some aspects, the 3D ball track or path generator 514 may also include an inlier detection process 520 and/or a video time offset calculator 528.

In various examples, the position of the ball in a 2D image may not uniquely identify the position in 3D. This can be because the ball can be at various distances from the camera and still appear in the same 2D image location. However, when a ball is moving, the trajectory can be modeled with simple laws of physics. Various embodiments can find the best 3D curve that satisfies the laws of physics and also matches up with the observed ball locations in 2D. A 3D physics model 518, as part of the 3D ball track generator 514, of the ball's movement in the real-world can, in some examples, be defined in parametric coordinates with an equation for each dimension, by equations that may resemble the following (the x, y, and z axes are shown visually in FIG. 1):

$$x_t = a_x * t + b_x$$

where the ball position along the x axis at time t, x_t, is a linear function.

$$y_t = a_y * t^2 + b_y * t + c_y,$$

where the ball position along the y axis at time t, $y_t$, is a quadratic function. The gravitational constant $a_y$ is already known to us by the laws of physics.

$$z_t = a_z * t + b_z,$$

where the ball position along the z axis at time t, $z_t$, is a linear function.

The parameters to solve for in such an example can be $a_x \ldots b_z$ which we can collectively call θ. The function $p_\theta(t)$, with known θ, would then output the position in 3D of the ball at time t, that can be computed using the x, y, and z formulas above. In other words, the ball track can be parametrized by θ. A ball physics model can be more complex in various embodiments to account for bounce, swing (in air curve), air resistance (slowdown), and other suitable physics, environmental factors, ball characteristics, and the like. For example, the y function may be a piecewise quadratic in a sport like cricket where the ball frequently bounces during the pitch. The x function may also be a quadratic function to account for a sport like baseball where the ball's movement in the horizontal direction is not linear due to possible curve balls. For example, in one embodiment for cricket, additional parameters used for optimization can be expressed as $d_x$, $d_y$, $d_z$ which describe how the ball bounces in the x, y, and z directions respectively.

Given the above, a function, $p_\theta(t-\Delta_c)$ which can represent the position of the ball in 3D at time t, can be computed using the x, y, z equations above, with known $\theta$ and offsets. Hence, $p_\theta(t-\Delta_0)=p_\theta(t-0)=p_\theta(t)$, can represent the position of the ball in 3D at time t, where t is the time frame of the primary camera. In other words, the ball track in various embodiments can be parametrized by $\theta$. In some examples, a ball physics model can be more complex to account for bounce, spin, swing (e.g., in air curve), and air resistance (e.g., slowdown), and other suitable physics, environmental factors, ball characteristics, and the like. For example, in various embodiments, the y function may be a piecewise quadratic in a sport like cricket where the ball frequently bounces during the pitch. The x function in some examples may also be a quadratic function to account for a sport like baseball where the ball's movement in the horizontal direction may not be linear due to possible curve balls. In another example, in one embodiment for cricket, additional parameters used for optimization can be expressed as $d_x$, $d_y$, $d_z$, which describe how the ball bounces in the x, y, and z directions respectively. The above formulas illustrate an example simple physics model for the 3D ball track but should not be construed to be limiting. Further physics models can be simpler or more complex in various further embodiments.

To compute the 3D track that best aligns with the 2D image location candidates from the C cameras and the physics model of the ball's movement, the 3D ball track generator 514 can perform one or more of the following operations, which in some cases, can be based on the RANSAC method of optimization.

The 3D ball track generator 514 may select C random subsets, Dc, comprising 2D image locations from some or all of the C input videos. In some cases, the subsets of 2D image locations may be selected from each on the C input videos 532, 542, 548 In some cases, the subsets may be selected such that, in each subset Dc, there is no more than one 2D image location from a given frame in a given input video. In some embodiments, the subsets may all contain the same number of elements, such as 1, 2, 3, 4, 5, 6 up to 10, 15, etc., image locations for each camera, but in further embodiments, they may contain a differing number of elements.

The optimization process 516 may, utilizing one or more optimization algorithms, find a 3D curve that best aligns with the C subsets, Dc, of 2D image locations, given the ball physics model, using the below equation:

$$\theta = \mathrm{Argmin}_\theta \Sigma c \Sigma_{d \in D_c} \|\mathrm{Proj}_c(p\theta(t_d - \Delta c) - d)\|$$

Where $c \in (0, C-1)$, $d \in \mathbb{R}^2$ and $t_d$ represents the time at which the frame corresponding to the 2D image location, d, was recorded in the time frame of camera c. To compute this nonlinear least-squares optimization, one embodiment uses the Ceres Solver library and the Levenberg-Marquardt algorithm.

In some embodiments, this optimization process 516 may be highly non-convex and difficult to solve. Some methods of solving this optimization problem benefit from having accurate initial estimates of the solution. Relatively accurate estimates of the solution may be provided, in some examples, using additional computer vision methods. In some embodiments, pose-estimation can be used to estimate when the ball was thrown, and initialize the parameters $\theta$ with values corresponding to this release time.

Next, the optimization process 516 may be repeated a number of iterations over all the 2D image location candidates, across the C cameras, and an inlier detection process 520 may also be performed on the iterations, to find the number of inliers 2D image locations that lie within a selected threshold 2D distance, $\varepsilon$, of the 2D projection of the 3D ball track. In some embodiments, the inliers may be found by finding detections, d, from our entire set of candidate image locations that satisfy the following inequality:

$$\theta(t_d - \Delta c) - d\| < \theta$$

We can define the score of this iteration as the number of detections that satisfy the above inequality. In some aspects, the operations may be performed in conjunction with or by the inlier detection process 520.

The optimization process 516 may be repeated for various numbers of subsets, which may be randomly selected, for a number of K integrations. K may be determined and refined or modified in some examples based on various factors like the computing device's processing power, or the like. The 3D ball track generator 514 may again fit a 3D curve using the equation described above. However, this time, the 3D ball track generator 514 may use the inlier detections (e.g., from the iteration that had the highest score as described above).

In some embodiments, the described example methods herein may be performed in real-time on smartphones that may be used for recording, such as an iPhone, iPad, or Android phone, or may be performed in the cloud by uploading the videos and processing the video on a remote server. In additional embodiments, this data can be communicated between filming devices using Bluetooth, infrastructure Wi-Fi, or web socket connections. The videos may be processed on each filming device with the candidate ball detections communicated between devices, or the videos themselves may be sent to a central processing unit which can perform algorithms for 3D ball tracking.

In other embodiments, the optimization may be performed on a set of candidate ball detections that is selected using a different method from that described above. In one embodiment, the candidate ball detections are found using a graph-based tracking algorithm, such as may be performed alternatively to the 2D ball location process 510.

In some cases, the ball detections from a specific camera can be denoted as Dc and for a specific ball detection, di, the frame that it was recorded can be t(di). In one embodiment, the longest sequence of ball detections for each camera d1 ... dn∈Dc may be determined, such that the detections are close in time and close in space. Formally, the longest sequence that satisfies the following condition for all di can be found:

$$\|di - di+1\| < \varepsilon 1 \text{ and } t(di) - t(di+1) < \varepsilon 2$$

In some embodiments, this can be computed using a dynamic programming solver, and in others it can be posed as a shortest path problem and solved with breadth-first or depth-first search. In some embodiments, we can use the candidate detections d1 ... dn from each camera and use them to solve the optimization problem of the previous section, which can provide the parameters describing the ball trajectory in 3D.

In some aspects, as described above, the time offset between multiple input videos may be accounted for by adding in a time variable into the parameterized equations that encompass the 3D physics model. In this way, a primary input video or camera device is selected, and all other input videos are correlated to the start time of the primary input video, and through the iterative process above, the 3D physics model is solved and a best approximate of the time offsets is determined. However, in some aspects, the 3D ball track generator 514 may determine one or more time offsets between the input videos separately or independently of the optimization process, such as via optional video time offset calculator 528. In these cases, an approximation of the offset may be determined based on other factors, such as one or more known times of the start of one or more of the input videos (e.g., if they are within a certain amount of accuracy, such as in the realm of milliseconds). In other cases, physics of the speed, direction, both (e.g., velocity), acceleration, max speed, max acceleration, distance, or other parameters that are known or have been observed about the ball or sports object may be used to infer an offset in time between different positions of the sports object in different input videos.

Figure 6:
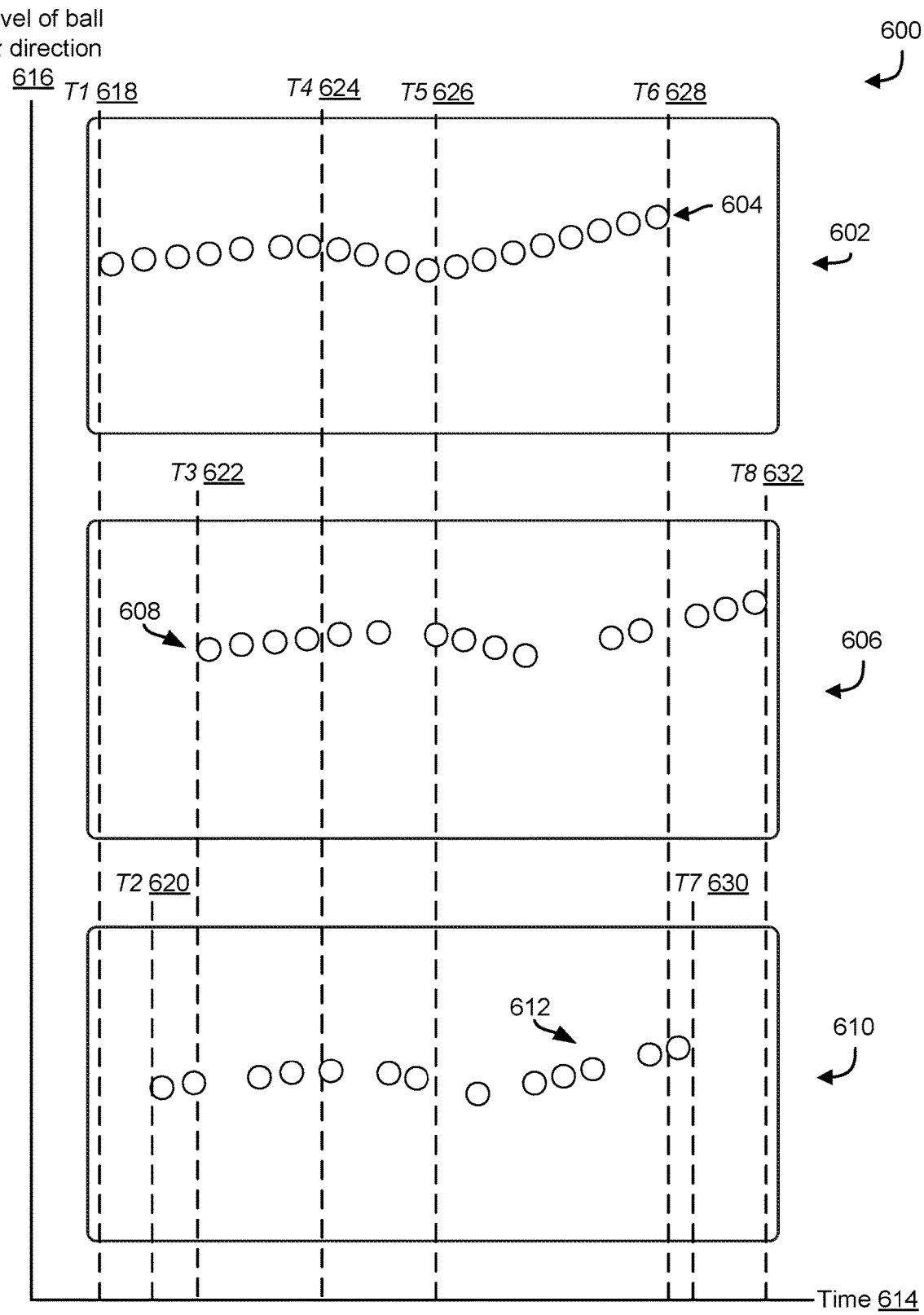
FIG. 6 illustrates an example of time offsets between multiple input videos capturing movement of a ball in a gaming environment, for example, according to at least one embodiment.

FIG. 6 illustrates an example diagram 600 of three ball locations 604, 608, 612 (e.g., 2D image locations) captured in three different input videos 602, 606, 610 starting at different times. The example ball locations 604, 608, 612 are shown relative to travel in the z direction (e.g., relative to the field described above in reference to FIG. 1), for illustrative purposes. It should be appreciated, however, that the ball locations could be offset with respect to one another in the x direction, the y direction, or a combination of two or more of the x, y, and z directions.

As illustrated, input video 602 first includes the ball at time T1 618, whereas input video 606 first includes the ball at time T3 622 and input video 610 first includes a ball at time T2 620. Using prior techniques, these videos could not be used together to accurately determine a 3D track of the ball. However, using one or more of the described techniques above, this time offset can be accounted for in iteratively determining the 3D track of the ball and accounting for the time offset between the different input videos. As also illustrate in FIG. 6, various individual positions of the ball across the different input videos may not match up, such as at time T5 624, T6 628, T7 630, and T8 632, for example due to different viewing angles of movement of the ball, obstructions between the camera device and the ball, etc., different frame rates of the camera devices, etc. By utilizing a unified physics model in determining the 3D track of the ball for the different input videos that factors in an unknown time offset between the different input videos 602, 606, 610, some or all of these discrepancies can be model and at least to some extent accounted for, to provide an accurate estimation of the 3D track of the ball.

Returning to FIG. 5, in some cases, there may be a determination as to whether to use one or more input videos for use with the 3D ball track generation. In some cases, if a video is of poor quality (an FPS below a certain threshold), does not have over a threshold number (e.g., at least 1, 2, 5, etc.) of ball locations within the video, has a percentage of the video frames containing the ball obstructed, and so on, the video may be discarded and not used in the 3D track generation process. In some cases, this determination may be made part way through the process, such as after 2D image locations of the ball have been identified from frames of a given input video. In other cases, this determination may be made before 2D image locations of the ball are identified in the video, such as based on a threshold FPS. In some cases, accuracy of the resulting 3D track may be increased by not using certain input videos. In yet some cases, such as where the time offset between videos is independently determined, such as in the example described above, or in cases where only one input video is available (or only one input video is left after filtering out other input videos that do not meet threshold requirements), the following technique may be alternatively used to determine the 3D track of the ball or sports object.

Amongst the set of 2D image locations of the ball at various times, each 2D image location can be the pixel location of the ball at time t. This can be represented in various examples as:

$$b_t \in R^2$$

where for each frame index t, we have a 2D ball detection in the image.

Given a set of 2D ball detections $b_t$, in various embodiments we can attempt to optimize for $\theta$ using the equation below:

$$\theta = \text{Argmin}_\theta \sum_t (Projection_t(p_\theta(t))) - b_t)^2$$

where for each frame index t, we have a 2D ball detection in the image.

The above formula can find a parametric 3D ball track such that the 3D position projected onto the camera screen (e.g., using a known camera projection matrix) that aligns with the detected ball position on the camera screen at every time step. $Projection_t$ refers to the camera projection matrix associated with frame t.

Such a 3D track may not be unique, which is why some embodiments can employ heuristics about the 3D track of the ball, such as the 3D position where the ball is released from (e.g., the pitcher's mound in baseball), reasonable places it could bounce (e.g., in cricket), and reasonable speeds of the ball. Such heuristics can be formulated as hard constraints or inequalities on the parameters of $\theta$ given as $g(\theta)$. For example, minimum and maximum speeds of the pitch for baseball or cricket can result in bounds on the parameter $a_z$, which can describe the movement of the ball in the direction of the batsman. In one embodiment for cricket and baseball, a neural network is used to detect the frame and position where the ball is thrown, and this location and frame is passed as a constraint to the 3D physics trajectory.

In one possible embodiment, the optimization equation can be formulated as follows to include desired constraints and heuristics, where we assign some penalty to our constraints on the trajectory $g(\theta$ $$\theta = \text{Argmin}_\theta \sum_t (Projection(p_\theta(t))) - b_t)^2 + \lambda * g(\theta)$$

In one embodiment, computing such a nonlinear least-squares optimization can be done with the Ceres Solver library and the Levenberg-Marquardt algorithm. Other suitable algorithms and methods for computing this optimization may be used in further embodiments.

In some aspect, the inlier detection process 520 may be a process executed by the 3D ball tracking system 506 to refine which candidate 2D ball locations, such as detected and identified by the 2D ball location process 510, are used to generate a 3D track or path of a ball in video captured of a gaming environment. In some aspects, the inlier detection process 520 enables a 3D curve to be fit to 2D image data that is robust to errors of the ball location process 510. In some embodiments, inlier detection process 520 can include an application of the algorithm known as RANSAC, which can provide robustness to errors in a ball detector. Given that the ball detector may falsely identify non-ball objects as the ball, optimizing over all detections can lead to a poor 3D track that will try to fit the correct and incorrect ball detections.

For example, let us assume that the 2D ball location process 510 identifies X 2D ball location candidates across the plurality of frames. A RANSAC algorithm or similar algorithm can randomly select N subsets of size k; for each subset of k 2D ball location candidates, a line can be fitted using by the 3D ball track generator 514/optimization process 516 and the distance between the fitted line and the remaining (X−k) candidates can be calculated. Amongst the (X−k) candidates, those that are within a predefined threshold distance from the line can be identified as inliers. Subsets that contain false ball detections may generally produce a curve that does not fit the remaining (X−k) detections. The subset with the highest number inliers after fitting a curve to the subset of k detections can be selected.

In some embodiments, one or more neural networks may be used to select the best curve, instead of only choosing the curve with the most inliers, such as may be trained on annotated frames of a gaming environment. In other embodiments, the inlier detection may be a 2D tracking algorithm such as a Kalman Filter or a shortest path algorithm which first finds a candidate subset of the 2D detections before performing the 3D curve fitting optimization previously described on this subset of detections.

In some cases, one or more of the camera projection matrix generation process 508, the 2D ball location process 510, the 3D ball track generator 514, and/or the video time offset calculator 528, may utilize data that may be locally or remotely stored and accessed from one or more storage devices or services 522. In one example, the storage device 522 may store one or more 3D physics models 524, which may be an example of 3D physics model 518, such as may be adapted or optimized for different gaming environments or different actions within different gaming environments, such as pitches in baseball, cricket, etc., a quarterback throws in football, a swing in golf, baseball, or cricket, a kick in soccer, etc. The 3D psychics model(s) 524 may capture certain movement patterns or bounds to those movement patterns of a ball or other object in the relevant gaming environment, which may be observed or known, such as a bounce in a cricket bowl or pitch, a curve ball in baseball, off axis rotation of a football, and so on.

In yet some cases, the storage device 522 may also store and/or enable access to one or more neural networks 526, which may include one or more CNNs 512 utilized by a 2D ball location process 510, one or more neural networks utilized by the camera projection matrix generation process 508, 3D ball track generator 514, the video time offset calculator 528, etc. In some cases, the 3D ball tracking system 506 may provide for an interface, such as through GUI 530 of user device 502, to enable users to rate or otherwise annotate generated 3D tracks, to enable better training of one or more neural networks 526 used by the 3D ball tracking system 506. In this way, as more users use the system 506, results may be better refined to provide more accurate tracks.

Upon generating and/or refining a 3D ball track of a ball moving in a gaming environment, the ball track may be provided to the user device 502, such as at operation 536 illustrated in FIG. 5. In some cases, the GUI 530 of the user device may format or otherwise modify the 3D ball track and display the ball track on at least one frame of the gaming environment captured by camera 504.

Figure 7:
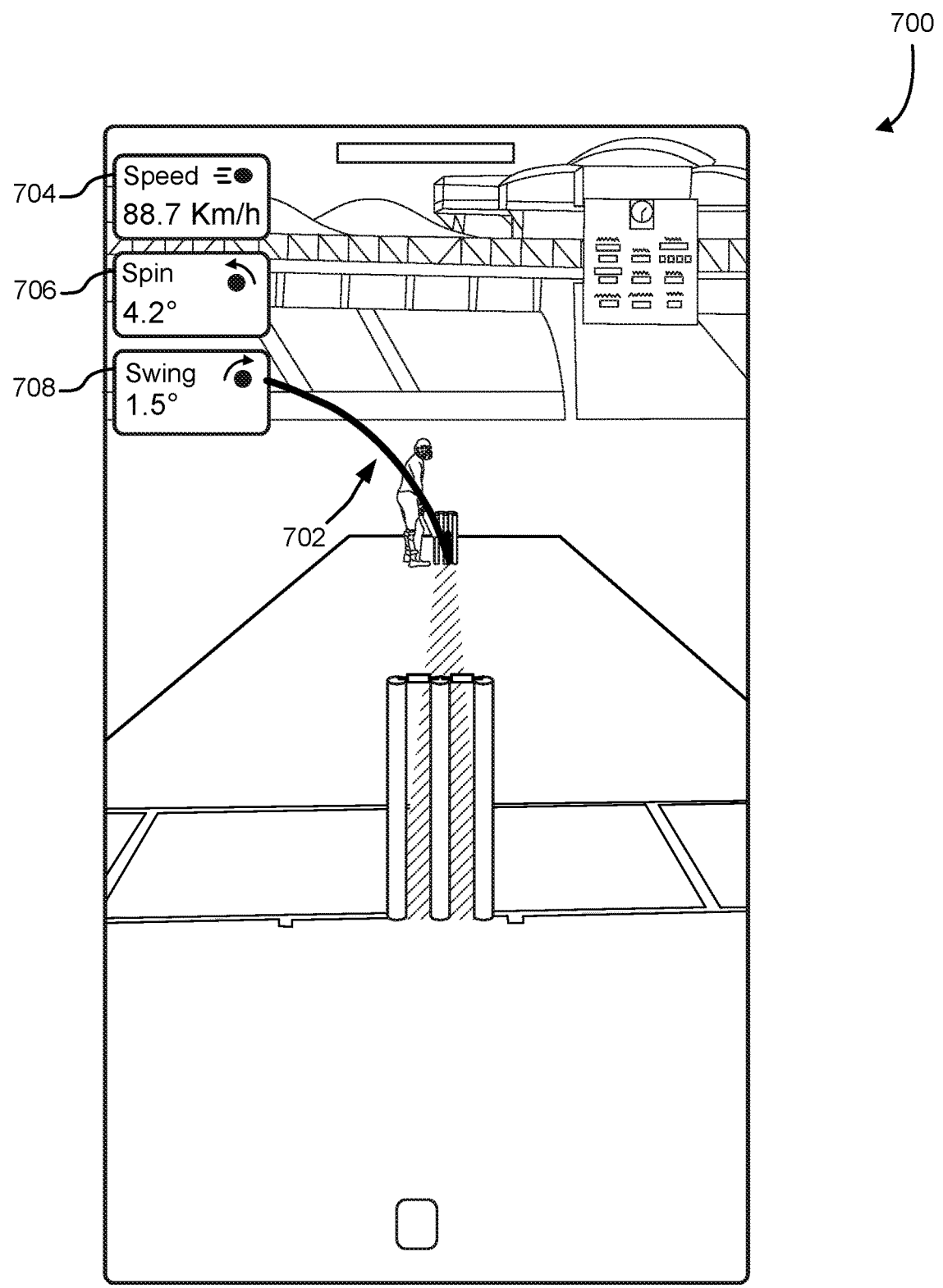
FIG. 7 illustrates an example view of a generated ball track or path including metrics of a pitch, which may be generated by the system of any of FIGS. 1-5, according to at least one embodiment.

FIG. 7 illustrates another example view 700, of a 3D generated ball track 702, shown without identified ball locations, which may be displayed to a user, such as through GUI 530 of user device 502. The ball track 702 may be fully three-dimensional representation, such that in some embodiments, the GUI 530 may provide for panning or changing a viewpoint of the ball track 702, such that the ball track 702 can be viewed from 360 degrees in the horizontal plane and/or vertical plane to provide for further analysis of the movement of the ball. In some cases, distances and other information may be annotated on the screen, such as may be determined used the 3D physics model.

View 700 may additionally include one or more displays 704, 706, 708, of various metrics or attributes of a pitch of a ball, such as the cricket ball illustrated in FIG. 7. For example, a max speed of the ball may be determined form the generated 3D ball track 702 and displayed in a box or icon 704. A spin and swing of the ball may similarly be displayed at 706, 708. Other metrics may also be determined and/or displayed for the ball, such as the location of the ball at certain points in the movement (e.g., height of the pitch as certain distances in the x, y, or z direction), and the like.

Figure 8:
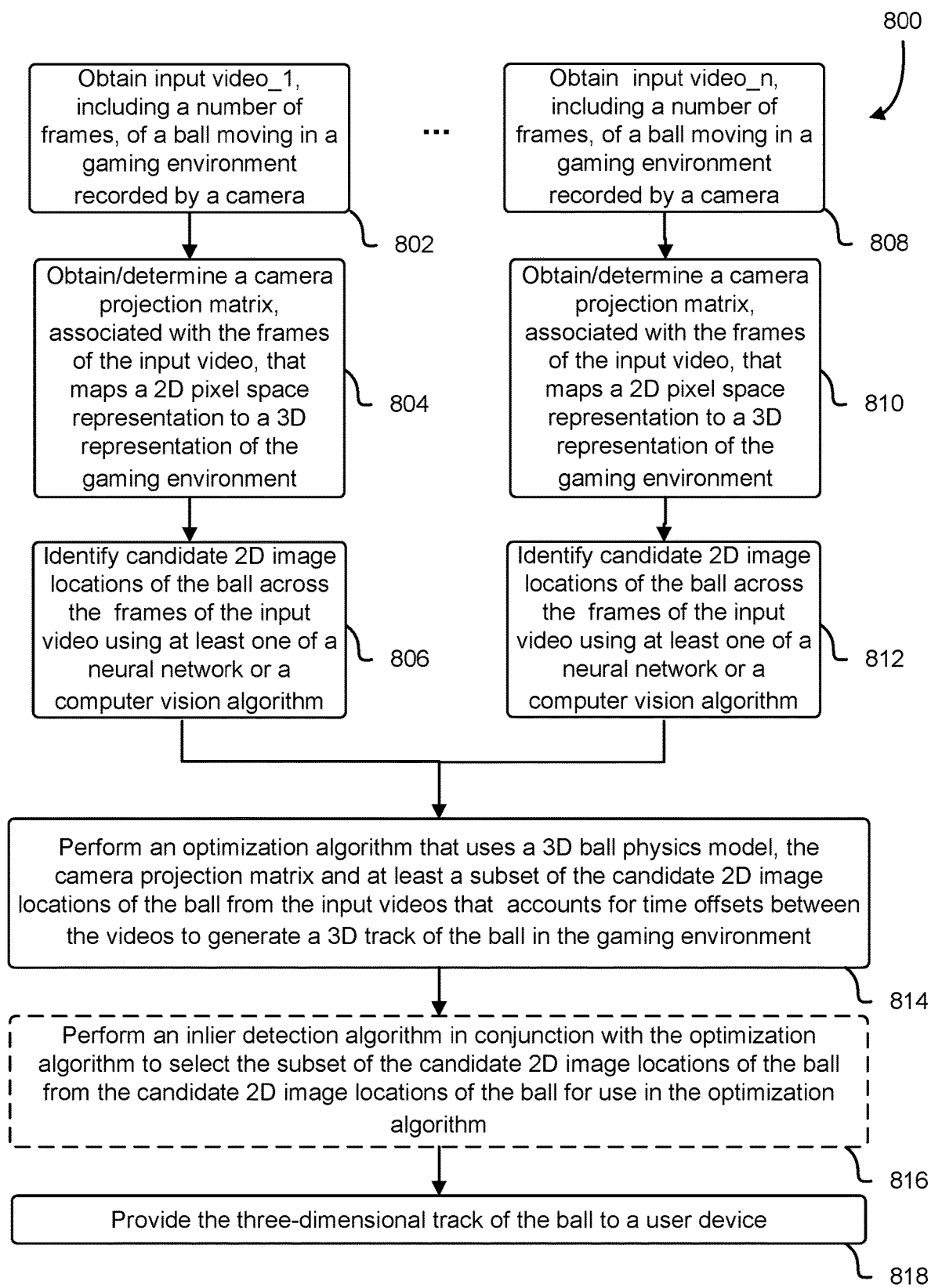
FIG. 8 illustrates an example process for generating a 3D ball track or path using multiple input videos, according to at least one embodiment.

FIG. 8 illustrates an example process 800 for generating a 3D ball track or path using multiple input videos. In some examples, process 800 may be performed by the 3D ball tracking system 506 and/or one or more of camera device 502, 538, 544 described above in reference to FIG. 5. In some cases, operations of process 800 may be performed by one or more of the camera projection matrix generation processes 508, the 2D ball location process 510, the 3D ball track generator 514, and/or various components or processes thereof, as described above in reference to FIG. 5.

In some cases, process 800 may begin at operations 802 and/or 808, where any number of input videos may be obtained from any number of different camera devices. In some cases, each input video may be selected such that only input videos meet threshold requirements are used further in process 800, such as videos having a certain quality or meeting certain thresholds (e.g., FPS, etc.). A camera projection matrix for each of the input videos may be determined or otherwise obtained, where the camera projection matrix maps a 2D pixel space representation to a 3D representation of the gaming environment, at operations 804 and 810. In some cases, the camera projection matrix may have been determined for a given camera in a prior video. In those cases, the camera projection matrix may be r-sued, such as when the camera device has not been moved.

Next, at operations 806 and 812, candidate 2D image locations of the ball across the frames of the respective input videos may be identified or determined. In some cases, operation 806 and 812 may include using at least one of a neural network or a computer vision algorithm. In some cases, operations 806 and 812 may be performed on a subset of frames of each input video, and in other cases, this operation may be performed on all of the frames of a given input video. This determination as to how many frames to use or analyze, in some cases, may be made based on available processing and/or memory capabilities of the device or system performing these operations.

In some cases, any of operations 802, 804, 806, and 808, 810, 812 may be performed by camera device capturing the input video, such as when the devices have available processing and/or memory capabilities to perform these operations. In some cases, such as the example described above in reference to FIG. 2, a primary camera device or other computing device, or a remote system, may perform these operations. In yet other cases, some or all of these operations may be split between the camera devices and a primary camera device or remote system, such as to reduce the amount of information communicated over one or more networks from these devices to a primary device or remote system. In yet some cases, hybrid topologies may be utilized where one camera device may perform operations 802, 804, and 806, and a primary camera device (which did not record the input video) or a remote system may perform operations 808, 810, and 812.

At operation 814, an optimization algorithm or process that uses a 3D ball physics model, the camera projection matrix and at least a subset of the candidate 2D image locations of the ball from the input videos may be performed to generate a 3D track of the ball in the gaming environment. In some cases, the optimization algorithm or process may be the include one or more of the equations described above in reference to FIG. 5, and/or may factor in or otherwise account for one or more time offsets between the different input videos.

Optionally, in some cases, an inlier detection algorithm or process may be performed in conjunction with the optimization algorithm to select the subset of the candidate 2D image locations of the ball from the candidate 2D image locations of the ball for use in the optimization algorithm, at operation 816. In some cases, the best fit 3D curve (e.g., including the values of the parameters that best align with the 2D image locations of the ball and comply with the appropriate physic model) may be selected from the optimization and/or inlier detection processes 814 and 816. This best fit 3D curve may then be provided to one or more sure devices, at operation 818. In some cases, as described above in reference to FIG. 7, other metrics of the movement of the ball may be provided and/or displayed with the 3D track.

While process 800 is described primarily in terms of tracking a ball or other sports object in a gaming environment, it should be appreciated that process 800 may be applicable to various object tracking scenarios, including various aviation applications (e.g., tracking flying objects or crafts), military or combat scenarios, other recreational activities (e.g., hunting automotive racing, motocross, mountain biking, and so on), or various actives in which analysis of movement of objects or people could prove useful.

Figure 9:
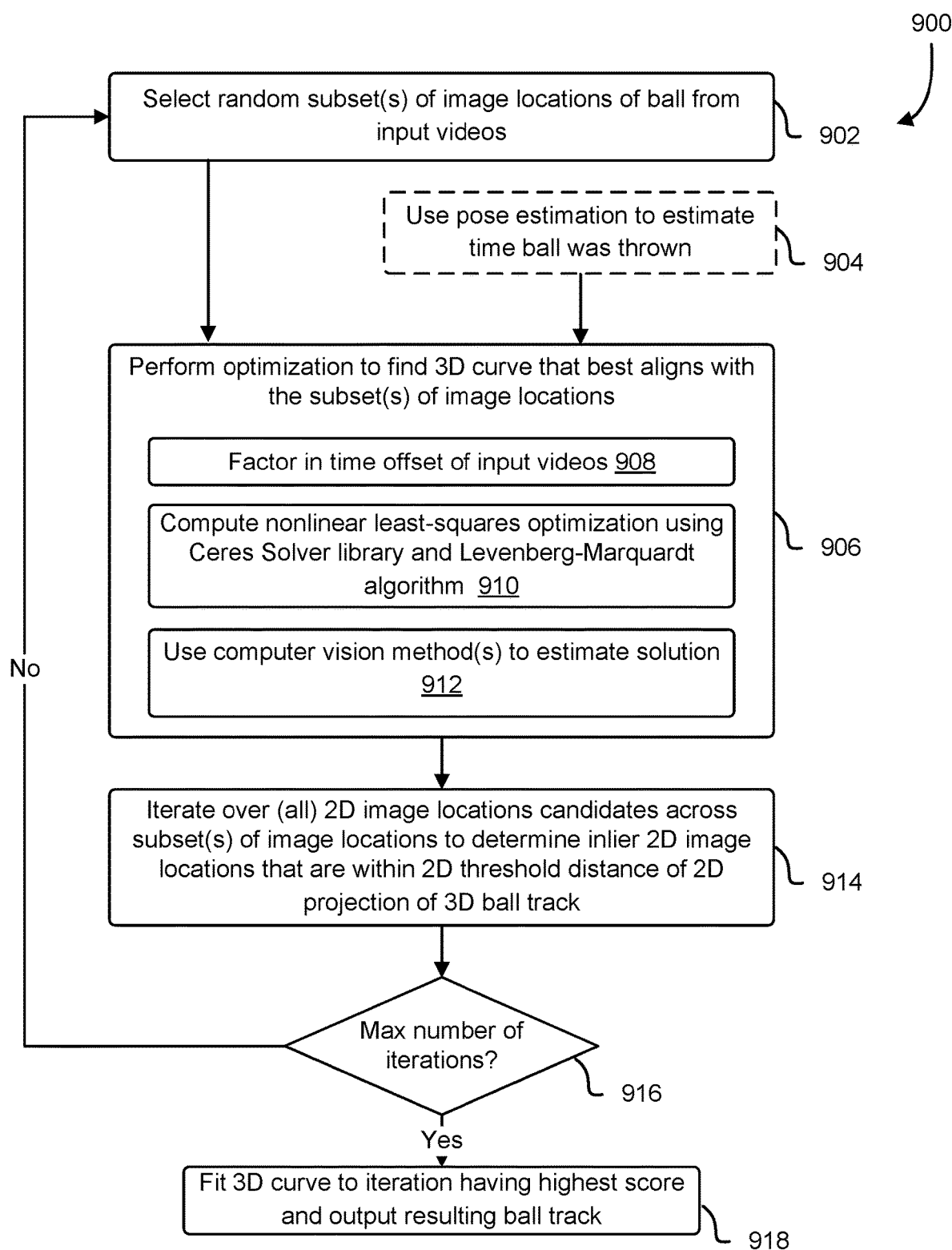
FIG. 9 illustrates another example process for generating a 3D ball track or path using multiple input videos, according to at least one embodiment.

FIG. 9 illustrates another example process 900 for generating a 3D ball track or path using multiple input videos. In some examples, process 900 may be performed by the 3D ball tracking system 506 and/or one or more of camera device 502, 538, 544 described above in reference to FIG. 5. In some cases, operations of process 900 may be performed by one or more of the camera projection matrix generation processes 508, the 2D ball location process 510, the 3D ball track generator 514, and/or various components or processes thereof, as described above in reference to FIG. 5.

In some aspects, process 900 may be an example of operations 814 and/or 816 described above in reference to FIG. 8. In other cases, process 900 may stand alone, such that it may be performed without the other operations of process 800.

Process 900 may begin at operation 902, in which a random subset of image locations of a ball (or other object) may be selected from an input video (or collection of images). In some cases, the subset of image locations may comprise pixel information, such as in or relating to two dimensions, and may be selected at random. In other cases, the subset of image locations may be selected in other ways, such sequentially in time, or via various known selection techniques.

The subset of image locations may then be input into an optimization process 906 to determine a 3D curve that best aligns with the image locations, at operation 906. In some cases, the optimizing or curve fitting process 906 may also take as an input, pose estimation that indicates a time when the ball or object was thrown, or other event that can be used to correlate relative time information of different input videos. In some cases, in addition or alternatively to a time the ball was thrown, other events can be sued in pose estimation, including when a ball hits the ground (e.g., a bonce in cricket pitch), when the ball is hit by a bat, or other events, such as when a ball is caught, and so on. In some cases, any pose estimation input may help increase the accuracy of the resulting 3D track or path generated by optimization process 904/process 900 as a whole.

The optimizing sub-process 906 may, in aspects, include one or more of following operations: factoring in a time offset between one or more of the input videos at operation 908, computing a nonlinear least-squares optimization using, in some cases, a Ceres Solver library and Levenberg-Marquardt algorithm at operation 910, and/or using computer visions method or methods to estimate the 3D curve solution, at operation 912. In some cases, one or more of operations 906, 908, 910, and/or 912 may include aspects descried above in reference to FIG. 5.

In conjunction with sub-process 906, process 900 may include operation 914, which includes iterating over (some or all) 2D image locations candidates across the subset(s) of image locations to determine inlier 2D image locations that are within 2D threshold distance of 2D projection of 3D ball track and removing 2D image locations that fall outside of the threshold distance. In some cases, operation 914 may include aspects the inlier detection process described above in reference to FIG. 5. Process 900 may then include determining if a set or maximum number of iterations has been reached, at operation 916. If not, process 900 may loop through operations 902-916, until a maximum number of iterations have been performed, at which point a 3D curve may be fit or calibrated to the iteration having the highest score. The resulting 3D track or curve and any associated metrics or derived data may then be output, at operation 918, such that the 3D track may be displayed to a user on a user device.

Some embodiments can include a method for determining the 3D position of a moving sports object in a gaming environment, given multiple input video of the gaming environment that were recorded on stable cameras placed in or around the field of play (which may or may not be time-synchronized) and a camera projection matrix associated with each frame of the input video from each camera and the gaming environment. The method may include performing a Computer Vision algorithm to identify candidate 2D image locations of the ball across a plurality of frames of the input videos of the gaming environment; iteratively performing an inlier detection algorithm and an optimization algorithm to compute the parameters of an equation that estimates the 3D position of the ball moving in the gaming environment, given the 2D image location candidates of the ball from the C cameras and a physics model that defines the movement of the ball in the given sport.

In some aspects, the described techniques may be include one or more of the following features or clauses:

1. A three-dimensional ball tracking system, comprising:
    a display device;
    one or more processors; and
    memory in communication with the one or more processors, and the display device, that stores computer-executable instructions that, when executed, cause the one or more processors to:
        obtain a plurality of input videos of a ball moving in a gaming environment from a plurality of camera devices, each of plurality of input videos comprising a plurality of frames;
        for each input video of the plurality of input videos:
            obtain a camera projection matrix associated with at least one frame of the plurality of frames of the input video and the gaming environment, the camera projection matrix mapping a two-dimensional pixel space representation to a three-dimensional representation of the gaming environment; and
            obtain candidate two-dimensional image locations of the ball across the plurality of frames of the input video of the gaming environment using at least one of a neural network or a computer vision algorithm;
        perform, multiple times using different subsets of the candidate two-dimensional image locations of the ball from at least two of the plurality of input videos, an optimization algorithm that uses a 3D ball physics model, the camera projection matrix and a subset of the candidate two-dimensional image locations of the ball from at least two of the plurality of input videos to generate multiple three-dimensional track of the ball in the gaming environment that factor in at least one time offset between the at least two input videos of the plurality of input videos; and
        provide a graphical representation of a three-dimensional track of the ball having a highest score from the multiple three-dimensional tracks of the ball, to the display device.
2. The three-dimensional ball tracking system of clause 1, wherein the system comprises the plurality of camera devices, and wherein the memory stores additional computer executable instructions that, when executed, further cause the individual camera devices of the plurality of camera devices to at least one of:
    determine the camera projection matrix associated with at least one frame of the plurality of frames of the input video and the gaming environment; or
    determine or obtain candidate two-dimensional image locations of the ball across the plurality of frames of the input video of the gaming environment.
3. The three-dimensional ball tracking system of clause 1 or 2, wherein at least the one or more processors are collocated with a first camera device of the plurality of camera devices, such that the computer executable instructions that, when executed, cause the one or more processors of the first camera device to perform, the optimization algorithm that uses the 3D ball physics model, the camera projection matrix and the subset of the candidate two-dimensional image locations of the ball from at least two of the plurality of input videos to generate the three-dimensional track of the ball in the gaming environment.
4. The three-dimensional ball tracking system of clause 3, wherein the memory stores additional computer executable instructions that, when executed, further cause the one or more processors to:
    select a number of the multiple times to perform the optimization algorithm based at least in part on one or more of an amount of the memory available to perform the optimization algorithm or a processing capability of the one or more processors.
5. The three-dimensional ball tracking system of any of clauses 1-4, wherein the memory stores additional computer executable instructions that, when executed, further cause the one or more processors to:
    filter out at least one input video of the plurality of videos, such that the at least one video is not used by the optimization process, based on at least one of: the input video having less than a threshold number of fames containing the ball, or a frames per second value associated with the at least one input video being less than a threshold value.
6. The three-dimensional ball tracking system of any of clauses 1-5, wherein the memory stores additional computer executable instructions that, when executed, further cause the one or more processors to:
    estimate a time when the ball was thrown using pose estimation; wherein the optimization process is performed using the estimated time to account for the at least one time offset between the at least two input videos of the plurality of input videos.
7 The three-dimensional ball tracking system of any of clauses 1-6, wherein the memory stores additional computer executable instructions that, when executed, further cause the one or more processors to:
    select the subset of the candidate two-dimensional image locations of the ball from the candidate two-dimensional image locations of the ball by removing erroneous candidate locations of the ball using an inlier detection algorithm.
8. The three-dimensional ball tracking system of any of clauses 1-7, wherein the memory stores additional computer executable instructions that, when executed, further cause the one or more processors to:
    determine metrics of movement of the ball based on the three-dimensional track of the ball; and
    provide the metrics overlaid onto the graphical representation of the three-dimensional track of the ball in the gaming environment to the display device.
9. A computer-implemented method, comprising:
    obtaining a plurality of input videos of a ball moving in a gaming environment from a plurality of camera devices, each of plurality of input videos comprising a plurality of frames;
    for each input video of the plurality of input videos:
        obtaining a camera projection matrix associated with at least one frame of the plurality of frames of the input video and the gaming environment, the camera projection matrix mapping a two-dimensional pixel space representation to a three-dimensional representation of the gaming environment; and
        identifying candidate two-dimensional image locations of the ball across the plurality of frames of the input video of the gaming environment using at least one of a neural network or a computer vision algorithm; and performing, multiple times using different subsets of the candidate two-dimensional image locations of the ball from at least two of the plurality of input videos, an optimization process that uses a 3D ball physics model, the camera projection matrix and a subset of the candidate two-dimensional image locations of the ball from at least two of the plurality of input videos to generate a three-dimensional track of the ball in the gaming environment that factors in at least one time offset between the at least two input videos of the plurality of input videos.

10. The computer-implemented method of clause 9, wherein performing the optimization process further comprise performing inlier detection on the subset of the candidate two-dimensional image locations of the ball from at least two of the plurality of input videos to remove at least some of the candidate two-dimensional image locations of the ball that are greater than a threshold distance away from the three-dimensional track of the ball.

11. The computer-implemented method of clause 9 or 10, wherein performing, multiple times using different subsets of the candidate two-dimensional image locations of the ball from at least two of the plurality of input videos, the optimization process that uses the 3D ball physics model, the camera projection matrix and the subset of the candidate two-dimensional image locations of the ball from at least two of the plurality of input videos to generate the three-dimensional track of the ball in the gaming environment further comprises:

performing the optimization process multiple times such that all the subsets of different subsets of the candidate two-dimensional image locations of the ball from the plurality of input videos are used in the optimization process at least once.

12. The computer-implemented method of any of clauses 9-11, wherein the three-dimensional physics model comprises at least three equations selected based on movement patterns of the ball in the gaming environment, wherein the three-dimensional physics model is selected based on a specific type of gaming environment.

13. The computer-implemented method of clause 12, wherein the gaming environment comprises a cricket gaming environment, and the at least three equations comprise at least one linear function and at least one quadratic function.

14. The computer-implemented method of any of clauses 9-13, further comprising applying one or more constraints, based on the three-dimensional physics model of the ball, to the equation that estimates the three-dimensional position of the ball moving in the gaming environment, the constraints selected based on a specific type of gaming environment.

15. A method, comprising:

obtaining at least two input videos of an object moving in an environment from a plurality of camera devices, each of the at least two input videos comprising a plurality of frames;

for each input video of the at least two input videos:
identify or determine candidate two-dimensional image locations of the object across the plurality of frames of the input video of the environment using at least one of a neural network, a computer vision technique, or a graph-based tracking process; and performing, at least two times using different subsets of the candidate two-dimensional image locations of the object from the at least two input videos, an optimization process that uses a 3D physics model, and a subset of the candidate two-dimensional image locations of the object from the at least two input videos to generate a three-dimensional track of the object in the environment that factors in at least one time offset between the at least two input videos.

16. The method of clause 15, further comprising:

determining the at least one time offset between the at least two input videos using at least one known start time of the at least two input videos.

17. The method of clause 15 or 16, further comprising:

for each input video of the at least two input videos, obtaining a camera projection matrix associated with at least one frame of the plurality of frames of the input vide, the camera projection matrix mapping a two-dimensional pixel space representation to a three-dimensional representation of the environment.

18. The method of any of clauses 15-17, wherein performing the optimization process further comprises performing an inlier detection process on the candidate two dimensional image locations of the object by removing at least some of the candidate two-dimensional image locations of the object that are greater than a threshold distance away from the three-dimensional track of the object.

19. The method of clause 18, wherein performing the optimization process produces at least two three-dimensional tracks of the object in the environment; and wherein the method further comprises:

scoring each of the at least two three-dimensional tracks of the object based on a number of the candidate two dimensional image locations of the object that are removed from the respective three-dimensional track of the object; and selecting the three-dimensional track of the object out of the at least two dimensional image locations of the object to display on a user device based on the scoring.

20. The method of any of clauses 15-19 wherein the optimization process is performed a number of times, such that all the subsets of different subsets of the candidate two-dimensional image locations of the object from the plurality of input videos are used in the optimization process at least once.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, in some embodiments, elements that are specifically shown in some embodiments can be explicitly absent from further embodiments. Accordingly, the recitation of an element being present in one example should be construed to support some embodiments where such an element is explicitly absent.

What is claimed is:

1. A three-dimensional ball tracking system, comprising:
a display device;
one or more processors; and
memory in communication with the one or more processors, and the display device, that stores computer-executable instructions that, when executed, cause the one or more processors to:
obtain a plurality of input videos of a ball moving in a gaming environment from a plurality of camera devices, each of plurality of input videos comprising a plurality of frames;
for each input video of the plurality of input videos:
obtain a camera projection matrix associated with at least one frame of the plurality of frames of the input video and the gaming environment, the camera projection matrix mapping a two-dimensional pixel space representation to a three-dimensional representation of the gaming environment; and
obtain candidate two-dimensional image locations of the ball across the plurality of frames of the input video of the gaming environment using at least one of a neural network or a computer vision algorithm;
perform, multiple times using different subsets of the candidate two-dimensional image locations of the ball from at least two of the plurality of input videos, an optimization algorithm that uses a 3D ball physics model, the camera projection matrix and a subset of the candidate two-dimensional image locations of the ball from at least two of the plurality of input videos to generate multiple three-dimensional tracks of the ball in the gaming environment that factor in at least one time offset between the at least two input videos of the plurality of input videos, the at least one time offset the result of the at least two input videos having different start times; and
provide a graphical representation of a three-dimensional track of the ball having a highest score from the multiple three-dimensional tracks of the ball, to the display device.

2. The three-dimensional ball tracking system of claim 1, wherein the system comprises the plurality of camera devices, and wherein the memory stores additional computer executable instructions that, when executed, further cause the individual camera devices of the plurality of camera devices to perform at least one of:
determine the camera projection matrix associated with at least one frame of the plurality of frames of the input video and the gaming environment; or
determine or obtain candidate two-dimensional image locations of the ball across the plurality of frames of the input video of the gaming environment.

3. The three-dimensional ball tracking system of claim 1, wherein at least the one or more processors are collocated with a first camera device of the plurality of camera devices, such that the computer executable instructions that, when executed, cause the one or more processors of the first camera device to perform, the optimization algorithm that uses the 3D ball physics model, the camera projection matrix and the subset of the candidate two-dimensional image locations of the ball from at least two of the plurality of input videos to generate the three-dimensional track of the ball in the gaming environment.

4. The three-dimensional ball tracking system of claim 3, wherein the memory stores additional computer executable instructions that, when executed, further cause the one or more processors to:
select a number of the multiple times to perform the optimization algorithm based at least in part on one or more of an amount of the memory available to perform the optimization algorithm or a processing capability of the one or more processors.

5. The three-dimensional ball tracking system of claim 1, wherein the memory stores additional computer executable instructions that, when executed, further cause the one or more processors to:
filter out at least one input video of the plurality of videos, such that the at least one video is not used by the optimization process, based on at least one of: the input video having less than a threshold number of frames containing the ball, or a frames per second value associated with the at least one input video being less than a threshold value.

6. The three-dimensional ball tracking system of claim 1, wherein the memory stores additional computer executable instructions that, when executed, further cause the one or more processors to:
estimate a time when the ball was thrown using pose estimation; wherein the optimization process is performed using the estimated time to account for the at least one time offset between the at least two input videos of the plurality of input videos.

7. The three-dimensional ball tracking system of claim 1, wherein the memory stores additional computer executable instructions that, when executed, further cause the one or more processors to:
select the subset of the candidate two-dimensional image locations of the ball from the candidate two-dimensional image locations of the ball by removing erroneous candidate locations of the ball using an inlier detection algorithm.

8. The three-dimensional ball tracking system of claim 1, wherein the memory stores additional computer executable instructions that, when executed, further cause the one or more processors to:
determine metrics of movement of the ball based on the three-dimensional track of the ball; and
provide the metrics overlaid onto the graphical representation of the three-dimensional track of the ball in the gaming environment to the display device.

9. A computer-implemented method, comprising:
obtaining a plurality of input videos of a ball moving in a gaming environment from a plurality of camera devices, each of plurality of input videos comprising a plurality of frames;
for each input video of the plurality of input videos:
obtaining a camera projection matrix associated with at least one frame of the plurality of frames of the input video and the gaming environment, the camera projection matrix mapping a two-dimensional pixel space representation to a three-dimensional representation of the gaming environment; and
identifying candidate two-dimensional image locations of the ball across the plurality of frames of the input video of the gaming environment using at least one of a neural network or a computer vision algorithm; and
performing, multiple times using different subsets of the candidate two-dimensional image locations of the ball from at least two of the plurality of input videos, an optimization process that uses a 3D ball physics model, the camera projection matrix and a subset of the candidate two-dimensional image locations of the ball from at least two of the plurality of input videos to generate a three-dimensional track of the ball in the gaming environment that factors in at least one time offset between the at least two input videos of the plurality of input videos based on the at least two input videos having different start times.

10. The computer-implemented method of claim 9, wherein performing the optimization process further comprise performing inlier detection on the subset of the candidate two-dimensional image locations of the ball from at least two of the plurality of input videos to remove at least some of the candidate two-dimensional image locations of the ball that are greater than a threshold distance away from the three-dimensional track of the ball.

11. The computer-implemented method of claim 9, wherein performing, multiple times using different subsets of the candidate two-dimensional image locations of the ball from at least two of the plurality of input videos, the optimization process that uses the 3D ball physics model, the camera projection matrix and the subset of the candidate two-dimensional image locations of the ball from at least two of the plurality of input videos to generate the three-dimensional track of the ball in the gaming environment further comprises:
 performing the optimization process multiple times such that all the subsets of different subsets of the candidate two-dimensional image locations of the ball from the plurality of input videos are used in the optimization process at least once.

12. The computer-implemented method of claim 9, wherein the three-dimensional physics model comprises at least three equations selected based on movement patterns of the ball in the gaming environment, wherein the three-dimensional physics model is selected based on a specific type of gaming environment.

13. The computer-implemented method of claim 12, wherein the gaming environment comprises a cricket gaming environment, and the at least three equations comprise at least one linear function and at least one quadratic function.

14. The computer-implemented method of claim 9, further comprising applying one or more constraints, based on the three-dimensional physics model of the ball, to the equation that estimates the three-dimensional position of the ball moving in the gaming environment, the constraints selected based on a specific type of gaming environment.

15. A method, comprising:
 obtaining at least two input videos of an object moving in an environment from a plurality of camera devices, each of the at least two input videos comprising a plurality of frames;
 for each input video of the at least two input videos:
  identify or determine candidate two-dimensional image locations of the object across the plurality of frames of the input video of the environment using at least one of a neural network, a computer vision technique, or a graph-based tracking process; and
 performing, at least two times using different subsets of the candidate two-dimensional image locations of the object from the at least two input videos, an optimization process that uses a 3D physics model, and a subset of the candidate two-dimensional image locations of the object from the at least two input videos to generate a three-dimensional track of the object in the environment that factors in at least one time offset between the at least two input videos based on the at least two input videos having different start times.

16. The method of claim 15, further comprising:
 determining the at least one time offset between the at least two input videos using at least one known start time of the at least two input videos.

17. The method of claim 15, further comprising:
 for each input video of the at least two input videos, obtaining a camera projection matrix associated with at least one frame of the plurality of frames of the input video, the camera projection matrix mapping a two-dimensional pixel space representation to a three-dimensional representation of the environment.

18. The method of claim 15, wherein performing the optimization process further comprises performing an inlier detection process on the candidate two dimensional image locations of the object by removing at least some of the candidate two-dimensional image locations of the object that are greater than a threshold distance away from the three-dimensional track of the object.

19. The method of claim 18, wherein performing the optimization process produces at least two three-dimensional tracks of the object in the environment; and wherein the method further comprises:
 scoring each of the at least two three-dimensional tracks of the object based on a number of the candidate two dimensional image locations of the object that are removed from the respective three-dimensional track of the object; and
 selecting the three-dimensional track of the object out of the at least two dimensional image locations of the object to display on a user device based on the scoring.

20. The method of claim 15 wherein the optimization process is performed a number of times, such that all the subsets of different subsets of the candidate two-dimensional image locations of the object from the plurality of input videos are used in the optimization process at least once.

* * * * *